(12) United States Patent
Li et al.

(10) Patent No.: US 11,186,067 B2
(45) Date of Patent: Nov. 30, 2021

(54) GYPSUM BOARD FROM GYPSUM HAVING HIGH LEVEL OF CHLORIDE SALT AND A STARCH LAYER AND METHODS ASSOCIATED THEREWITH

(71) Applicant: UNITED STATES GYPSUM COMPANY, Chicago, IL (US)

(72) Inventors: Qinghua Li, Rolling Meadows, IL (US); Runhai Lu, Wauconda, IL (US); Charles W. Cochran, Elkhorn, WI (US); Mark Hemphill, Hawthorn Woods, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 26 days.

(21) Appl. No.: 16/401,719

(22) Filed: May 2, 2019

(65) Prior Publication Data
US 2020/0055278 A1 Feb. 20, 2020

Related U.S. Application Data

(60) Provisional application No. 62/718,599, filed on Aug. 14, 2018.

(51) Int. Cl.
*B32B 13/08* (2006.01)
*B32B 29/06* (2006.01)
(Continued)

(52) U.S. Cl.
CPC .............. *B32B 13/08* (2013.01); *B32B 3/26* (2013.01); *B32B 29/002* (2013.01); *B32B 29/06* (2013.01);
(Continued)

(58) Field of Classification Search
CPC ......... B32B 13/08; B32B 3/26; B32B 29/002; B32B 29/06; B32B 2255/12;
(Continued)

(56) References Cited

U.S. PATENT DOCUMENTS

| 654,024 A | 7/1900 | Patrick |
| 1,190,431 A | 7/1916 | Linkletter et al. |

(Continued)

FOREIGN PATENT DOCUMENTS

| CA | 998929 A | 10/1976 |
| EP | 1112986 A1 | 7/2001 |

(Continued)

OTHER PUBLICATIONS

Debra F Pflughoeft-Hassett et al., A Comparison of Properties of FGD & Natural Gypsum Products, Agricultural & Industrial Uses of FGD Gypsum Workshop, EERC, Oct. 23, 2007, Atlanta, Georgia.

(Continued)

*Primary Examiner* — Humera N. Sheikh
*Assistant Examiner* — John D Schneible
(74) *Attorney, Agent, or Firm* — Vorys, Sater, Seymour and Pease LLP; Pradip Sahu; Philip T. Petti

(57) ABSTRACT

Gypsum boards formed from synthetic gypsum and other gypsum sources having high chloride salt concentrations. Gypsum boards may include a board core including set gypsum. A total concentration of the chloride anion in the board core ranges from about 500 ppm to about 3000 ppm, typically about 1000 ppm to about 3000 ppm, based on weight of the calcium sulfate hemihydrate. An inner surface of a front paper cover sheet contacts a first face of the board core. An inner surface of a back paper cover sheet contacts a second face of the board core. A starch layer coats the inner surface of at least one of the front and back cover sheet.

(Continued)

Methods of making the gypsum board, and a wall system for employing the gypsum boards, are also provided.

19 Claims, 4 Drawing Sheets

(51) Int. Cl.
- *B32B 29/00* (2006.01)
- *B32B 3/26* (2006.01)
- *C04B 28/14* (2006.01)
- *C04B 111/00* (2006.01)

(52) U.S. Cl.
CPC ........ *C04B 28/142* (2013.01); *B32B 2255/12* (2013.01); *B32B 2255/26* (2013.01); *B32B 2607/00* (2013.01); *C04B 2111/0062* (2013.01)

(58) Field of Classification Search
CPC ............ B32B 2255/26; B32B 2607/00; C04B 28/142; C04B 2111/0062
USPC ...................................................... 428/312.4
See application file for complete search history.

(56) References Cited

U.S. PATENT DOCUMENTS

| | | |
|---|---|---|
| 1,439,954 A | 12/1922 | Emerson |
| 1,568,314 A | 1/1926 | Buttress et al. |
| 1,890,674 A | 12/1932 | Delaney |
| 2,078,199 A | 4/1937 | King |
| 2,239,107 A | 4/1941 | Lefebure |
| 2,879,662 A | 3/1959 | Spinelli |
| 3,382,636 A | 5/1968 | Green |
| 3,516,882 A | 6/1970 | Cummisford |
| 3,573,947 A | 4/1971 | Kinkade et al. |
| 4,009,062 A * | 2/1977 | Long ...................... B32B 13/08 156/39 |
| 4,051,291 A | 9/1977 | Long |
| 4,117,183 A | 9/1978 | Long |
| 4,327,146 A | 4/1982 | White |
| 4,544,424 A | 10/1985 | Take et al. |
| 5,256,222 A | 10/1993 | Shepherd et al. |
| 5,643,510 A | 7/1997 | Sucech |
| 5,683,635 A | 11/1997 | Sucech et al. |
| 5,798,425 A | 8/1998 | Albrecht et al. |
| 6,342,284 B1 | 1/2002 | Yu et al. |
| 6,409,825 B1 | 6/2002 | Yu et al. |
| 6,494,609 B1 | 12/2002 | Wittbold et al. |
| 6,632,550 B1 | 10/2003 | Yu et al. |
| 6,694,695 B2 | 2/2004 | Collins et al. |
| 6,777,517 B1 | 8/2004 | Albrecht et al. |
| 6,815,049 B2 | 11/2004 | Veeramasuneni et al. |
| 6,822,033 B2 | 11/2004 | Yu et al. |
| 6,874,930 B2 | 4/2005 | Wittbold et al. |
| 7,244,304 B2 | 7/2007 | Yu et al. |
| 7,364,676 B2 | 4/2008 | Sucech et al. |
| 7,731,794 B2 | 6/2010 | Yu et al. |
| 7,892,472 B2 | 2/2011 | Veeramasuneni et al. |
| 8,133,600 B2 | 3/2012 | Wang et al. |
| 8,257,489 B2 | 9/2012 | Yu et al. |
| 8,262,820 B2 | 9/2012 | Yu et al. |
| 8,303,159 B2 | 11/2012 | Yu et al. |
| 8,398,764 B2 | 3/2013 | Mahoney et al. |
| 8,470,461 B2 | 6/2013 | Yu et al. |
| 9,945,119 B2 | 4/2018 | Aldabaibeh et al. |
| 10,427,979 B2 | 10/2019 | Harrison et al. |
| 2005/0067082 A1 | 3/2005 | Mowry |
| 2007/0023118 A1 | 2/2007 | Spielvogel |
| 2007/0102237 A1 | 5/2007 | Baig |
| 2007/0141304 A1 | 6/2007 | Agrawal |
| 2007/0148430 A1 | 6/2007 | Agrawal |
| 2007/0149078 A1 | 6/2007 | Nandi et al. |
| 2007/0255032 A1 | 11/2007 | Bichler et al. |
| 2010/0247937 A1 | 9/2010 | Liu et al. |
| 2012/0168527 A1 | 7/2012 | Li et al. |
| 2012/0170403 A1 | 7/2012 | Li et al. |
| 2014/0000979 A1 | 1/2014 | Dugan et al. |
| 2014/0113124 A1 | 4/2014 | Sang et al. |
| 2014/0113128 A1 | 4/2014 | Sang et al. |
| 2015/0010767 A1 | 1/2015 | Sang et al. |
| 2015/0306846 A1 | 10/2015 | Xu et al. |
| 2016/0258157 A1 | 9/2016 | Yu et al. |
| 2016/0375655 A1 | 12/2016 | Li et al. |
| 2017/0166792 A1 | 6/2017 | Ayambem |
| 2017/0183868 A1* | 6/2017 | Yu et al. ................... E04C 2/04 |
| 2017/0246838 A1 | 8/2017 | Rohlf |
| 2018/0065336 A1 | 3/2018 | Shubert et al. |
| 2018/0066400 A1 | 3/2018 | Waldron et al. |

FOREIGN PATENT DOCUMENTS

| | | |
|---|---|---|
| EP | 1114005 A1 | 7/2001 |
| GB | 490667 A | 8/1938 |
| GB | 516484 A | 1/1940 |
| GB | 879392 A | 10/1961 |
| GB | 1381457 A | 1/1975 |
| GB | 1573871 A | 8/1980 |
| WO | 9957371 A1 | 11/1999 |
| WO | 0006518 A | 2/2000 |

OTHER PUBLICATIONS

Machine Translation of JP 2005-146651 (Year: 2005).

\* cited by examiner

Effect of diluted starch solution on 12 inch x 12 inch x 1/2 inch board containing 1200 ppm Cl⁻ from $MgCl_2$ Effect of diluted starch solution on 12 inch x 12 inch x 1/2 inch board containing 2100 ppm Cl⁻ from $MgCl_2$ Effect of diluted starch solution and perforation on 12 inch x 12 inch x 1/2 inch board containing 2000 ppm Cl⁻ from NaCl Effect of diluted starch solution on 12 inch x 12 inch x 1/2 inch board containing 30 ppm Cl⁻ from NaCl

GYPSUM BOARD FROM GYPSUM HAVING HIGH LEVEL OF CHLORIDE SALT AND A STARCH LAYER AND METHODS ASSOCIATED THEREWITH

CROSS-REFERENCE TO RELATED APPLICATION

This claims the benefit of U.S. provisional patent application No. 62/718,599, filed Aug. 14, 2018, incorporated herein by reference in its entirety.

FIELD OF THE INVENTION

The present invention relates to gypsum board formed from synthetic gypsum and other gypsum sources having high chloride salt concentrations. The present invention also provides a method of preparing the gypsum board with a starch layer to improve adhesion of a gypsum board core to a paper cover sheet relative to a gypsum board without the starch layer, and a wall system for employing the gypsum board.

BACKGROUND OF THE INVENTION

In the construction of buildings, one of the more common building elements for construction and remodeling is gypsum wallboard, often known as drywall, gypsum boards, gypsum panels, gypsum paneling, and ceiling tiles. In chemical terms, gypsum is calcium sulfate dihydrate ($CaSO_4 \cdot 2H_2O$).

Set gypsum (calcium sulfate dihydrate) is a well-known material that is used in such products. Panels containing set gypsum are often referred to as gypsum boards, which contain a board core (set gypsum core) sandwiched between two cover sheets, particularly paper cover sheets. Such panels are commonly used in drywall construction of the interior walls and ceilings of buildings. One or more denser regions, often referred to as "skim coats," may be included as layers on either face of the board core, usually at an interface between the board core and an inner surface of a cover sheet or a coating thereon. The denser regions may be contiguous with a less dense region of the gypsum layer which provides the gypsum core layer of the gypsum board.

During manufacture of a gypsum board, the stucco (containing calcium sulfate hemihydrate), water, and other ingredients as appropriate may be mixed, typically in a mixer to form an aqueous gypsum slurry. The terms of art aqueous gypsum slurry or aqueous slurry or gypsum slurry are typically employed for the slurry both before and after the calcium sulfate hemihydrate converts to calcium sulfate dihydrate. The gypsum slurry is formed and discharged from the mixer onto a moving conveyor carrying a first cover sheet, optionally bearing a skim coat. If present, the skim coat is applied upstream from the location where the gypsum slurry is discharged onto the first cover sheet. After applying the gypsum slurry to the first cover sheet, a second cover sheet, again optionally bearing a skim coat, is applied onto the gypsum slurry to form a sandwich assembly having a desired thickness. A forming plate, roller or the like may aid in setting the desired thickness. The gypsum slurry is then allowed to harden by forming set (i.e., rehydrated) gypsum through a reaction between the calcined gypsum and water to form a matrix of crystalline hydrated gypsum (i.e., calcium sulfate dihydrate, also known as set gypsum). The desired hydration of the calcined gypsum promotes formation of an interlocking matrix of set gypsum crystals, thereby imparting strength to the gypsum board. Heat may be applied (e.g., using a kiln) to drive off the remaining free (i.e., unreacted) water to yield a dry product. Then the set gypsum product is cut to form gypsum boards having a desired length.

Gypsum (calcium sulfate dihydrate and any impurities) suitable for use in wallboard may be obtained from both natural sources and synthetic sources, followed by further processing.

Natural gypsum may be used by calcining its calcium sulfate dihydrate to produce the hemihydrate form. Gypsum from natural sources is a naturally occurring mineral and can be mined in rock form. Naturally occurring Gypsum is a mineral that is typically found in old salt-lake beds, volcanic deposits, and clay beds. When it is mined, raw gypsum is generally found in the dihydrate form Gypsum is also known as calcium sulfate dihydrate, terra alba or landplaster. This material is also produced as a by-product in various industrial processes. For example, synthetic gypsum is a byproduct of flue gas desulfurization processes from power plants. In gypsum, there are approximately two molecules of water associated with each molecule of calcium sulfate.

Plaster of Paris is also known as calcined gypsum, stucco, calcium sulfate semihydrate, calcium sulfate half-hydrate or calcium sulfate hemihydrate.

When calcium sulfate dihydrate from either source is heated sufficiently, in a process called calcining or calcination, the water of hydration is at least partially driven off and there can be formed either calcium sulfate hemihydrate ($CaSO_4 \cdot \frac{1}{2}H_2O$) (typically provided in the material commonly referred to as "stucco") or calcium sulfate anhydrite ($CaSO_4$) depending on the temperature and duration of exposure. As used herein, the terms "stucco" and "calcined gypsum" refer to both the hemihydrate and anhydrite forms of calcium sulfate that may be contained therein. Calcination of the gypsum to produce the hemihydrate form takes place by the following equation:

$$CaSO_4 \cdot 2H_2O \rightarrow CaSO_4 \cdot 0.5H_2O + 1.5H_2O$$

Calcined gypsum is capable of reacting with water to form calcium sulfate dihydrate, which is a rigid product and is referred to herein as "set gypsum."

Gypsum may also be obtained synthetically (referred to as "syngyp" in the art) as a by-product of industrial processes such as flue gas desulfurization from power plants, for example. Natural or synthetic gypsum can be calcined at high temperatures, typically above 150° C., to form stucco (i.e., calcined gypsum in the form of calcium sulfate hemihydrate and/or calcium sulfate anhydrite), which may undergo subsequent rehydration to form set gypsum in a desired shape, such as a board.

Synthetic gypsum obtained from power plants is usually suitable for use in gypsum panels intended for construction projects. Synthetic gypsum is a byproduct of flue gas desulfurization processes from power plants (also known as desulphurisation gypsum or desulphogyspum or DSG). In particular, flue gas including sulfur dioxide is wet scrubbed with lime or limestone, which produces calcium sulfite in the following reaction.

$$CaCO_3 + SO_2 \rightarrow CaSO_3 + CO_2$$

The calcium sulfite is then converted to calcium sulfate in the following reaction.

$$CaSO_3 + 2H_2O + \frac{1}{2}O_2 \rightarrow CaSO_4 \cdot 2H_2O$$

The hemihydrate form may then be produced by calcination in a similar manner to that used for natural gypsum.

However, many conventional coal-fired power plants are being shut down in favor of more environmentally friendly sources of energy. The shutdown of coal-fired power plants has created a growing shortage of synthetic gypsum suitable for producing gypsum panels. Lower quality synthetic gypsum is available from power plants and other sources, but this alternatively sourced gypsum often contains fairly high concentrations of extraneous salts, particularly magnesium or sodium salts, more particularly magnesium chloride and sodium chloride. Small amounts of potassium chloride and calcium chloride may also be present in alternatively sourced synthetic gypsum. The extraneous salts can be problematic due to their tendency to decrease adhesion between the board core and the cover sheets, particularly a back paper cover sheet.

It will be appreciated that this background description has been created by the inventors to aid the reader, and is neither a reference to prior art nor an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

BRIEF SUMMARY OF THE INVENTION

The invention relates to gypsum boards having significant adhesion between the board core and one or more of the paper cover sheets, even when appreciable quantities of extraneous salts are present, particularly chloride salts, and more particularly NaCl, KCl, $MgCl_2$ and/or $CaCl_2$). Methods for producing the gypsum boards from salt-containing gypsum sources, particularly low-quality synthetic gypsum, are provided. Improved adhesion between the board core and the paper cover sheets may be realized by providing a starch layer coated on an inner surface of at least one of the paper cover sheets, particularly a back paper cover sheet.

Thus, in one aspect, the invention provides gypsum boards comprising a board core comprising set gypsum. Typically it also includes one or more chloride salts such as NaCl, KCl, $MgCl_2$, or $CaCl_2$), or any combination thereof.

In particular the invention provides a gypsum board comprising:

a board core layer comprising set gypsum, a front paper cover sheet having an outer surface and an inner surface, the inner surface contacting a first face of the board core; and a back paper cover sheet having an outer surface and an inner surface, the inner surface contacting a second face of the board core;

wherein the inner surface of at least one of the front paper cover sheet and the back paper cover sheet is coated with a starch layer;

wherein the core layer is between the first cover sheet and the second cover sheet, wherein the core layer resulted from setting, between the front paper cover sheet and the back cover sheet, an aqueous slurry comprising a mixture of water and stucco, wherein the stucco comprises calcium sulfate hemihydrate, wherein the aqueous slurry comprises:

at least 60 weight percent said calcium sulfate hemihydrate on a dry (water free) basis, about 500 ppm to about 3000 ppm chloride anions per 1,000,000 parts by weight said calcium sulfate hemihydrate, and the water at a weight ratio of water to the calcium sulfate hemihydrate of 0.2:1 to 1.2:1.

The inner surface of a front paper cover sheet having an outer surface and an inner surface contacts a first face of the board core. The inner surface of a back paper cover sheet having an outer surface and an inner surface contacts a second face of the board core. The inner surface of at least one of the front paper cover sheet and the back paper cover sheet is coated with a starch layer. More particularly, the outer surface of the back paper cover sheet may be attached to a wall once the gypsum board has been installed, and the outer surface of the front paper cover sheet may face outwardly from the wall once the gypsum board has been installed. One or both of the cover sheets may comprise a paper cover sheet, which may be the same or different paper materials.

The calcium sulfate hemihydrate is present in the deposited aqueous slurry of the invention in amounts of at least 60 weight % of the dry (water free) materials of the aqueous slurry. Preferably the calcium sulfate hemihydrate is at least 70 weight percent of the dry (water free) materials of the aqueous slurry, more preferably at least 80 weight % of the dry (water free) materials of the aqueous slurry, furthermore preferably at least 90 weight % of the dry (water free) materials of the aqueous slurry. In typical wallboard formulations of the invention the dry (water free) materials of the aqueous slurry has at least 90 weight percent or at least 95 weight % calcium sulfate hemihydrate. Use of calcium sulfate anhydrite is also contemplated, although it is preferably used in small amounts of less than 20 weight % of the dry (water free) materials of the aqueous slurry.

Likewise, calcium sulfate dihydrate is present in the board core layer of the gypsum board of the invention resulting from setting the aqueous slurry is at least 60 wt. % of the core, preferably at least 70 wt. %, and more preferably at least 80 wt. %. In typical wallboard formulations the dry (water-free) materials of the aqueous slurry have at least 90 wt. % or at least 95 wt. % calcium sulfate dihydrate.

In one or more other aspects of the invention, the invention provides methods for preparing a gypsum board having significant quantities of one or more extraneous salts in a board core. The gypsum boards may exhibit significant adhesion between the board core and one or more of the cover sheets, particularly a back paper cover sheet, even when the one or more extraneous salts are present. The method prepares the gypsum board with a starch layer to improve adhesion of the gypsum board core to the cover sheet relative to a gypsum board without the starch layer.

In its method respects the invention provides a method of making a gypsum board comprising:

preparing an aqueous slurry comprising a mixture of water and stucco, wherein the stucco comprises calcium sulfate hemihydrate, wherein the aqueous slurry comprises a mixture of:

at least 60 weight percent said calcium sulfate hemihydrate on a dry basis, about 500 ppm to about 3000 ppm chloride anions per 1,000,000 parts by weight (pbw) said calcium sulfate hemihydrate, and the water at a weight ratio of water to the calcium sulfate hemihydrate of 0.2:1 to 1.2:1; and disposing the aqueous slurry between a front paper cover sheet and a back paper cover sheet to form a panel, each cover sheet having an inner surface and an outer surface;

wherein the inner surface of at least one of the front paper cover sheet and the back paper cover sheet is coated with a starch layer, wherein the gypsum slurry contacts the starch layer;

setting the calcium sulfate hemihydrate to form a panel comprising a gypsum core comprising calcium sulfate dihydrate; and drying the panel and cutting the panel into a gypsum board having one or more pre-determined dimensions.

About 500 ppm to about 3000 ppm chloride anions per 1,000,000 parts by weight said calcium sulfate hemihydrate means that for 1,000,000 parts by weight said calcium sulfate hemihydrate the amount of chloride anions present is about 500 ppm to about 3000 ppm.

The concentration of the chloride anion in the aqueous slurry used to make gypsum board products and to perform methods of the invention may range from about 500 ppm to about 3000 ppm, typically from about 1000 ppm to about 3000 ppm, more typically from about 2000 ppm to about 3000 ppm, per 1,000,000 parts by weight calcium sulfate hemihydrate.

The chloride anion in the aqueous slurry used for products and methods of the invention may arise from any source. Generally, the one or more chloride salts are present in the gypsum source used to form the board core of the invention. The gypsum source may be a synthetic gypsum source, particularly a low-quality synthetic gypsum obtained from a power plant flue gas stream. Thus, generally the source of the chloride anion is the one or more chloride salts in the stucco used to make the aqueous slurry. The chloride anions are derived from the chloride atoms of the one or more chloride salts in the stucco when the stucco is used in the aqueous slurries. Typically, the one or more chloride salts are any of NaCl, KCl, $MgCl_2$, $CaCl_2$, or any combination thereof. However, the chloride anions may also arise from impurities, such as one or more chloride salts, in water used to make the gypsum slurry Typically, the aqueous gypsum slurry dry (water free) components used for products and methods of the invention, and as a result the board core has less than 10 wt. %, more typically an absence of, Portland cement or other hydraulic cement or any combination thereof. Typically, the aqueous slurry dry (water free) components, and as a result the board core has less than 10 wt. %, more typically an absence of, fly ash. Typically, the aqueous slurry dry (water free) components, and as a result the board core has less than 10 wt. %, more typically an absence of, calcium carbonate.

For purposes of this disclosure a dry basis is a water free basis.

All average molecular weights, percentages and ratios used herein, are by weight (i.e., wt. %) unless otherwise indicated.

In one or more other aspects of the invention, the invention provides a wall system comprising framing to which is attached at least one gypsum board of the invention, wherein the outer surface of the front paper cover sheet faces away from the framing. In this wall system, the gypsum board may be on an interior wall or ceiling of a building. Typically, the framing is wood or metal. Typically the at least one gypsum board is attached to the framing by any one or more of screws, nails, glue, or other mechanical fasteners.

Advantages of the present invention may become apparent to those having ordinary skill in the art from a review of the following detailed description, taken in conjunction with the examples, and the appended claims. It should be noted, however, that while the invention is susceptible of various forms, the present disclosure is intended as illustrative, and is not intended to limit the invention.

DETAILED DESCRIPTION OF THE INVENTION

The present invention provides the ability to use gypsum containing relatively high amounts of extraneous salts in the board core of a gypsum board. Under ordinary circumstances, high salt concentrations in the board core may result in insufficient adhesion between the board core and at least one of the front paper cover sheet and the back cover sheet, particularly the back cover sheet.

Surprisingly, a starch layer disposed on the inner surface(s) of the cover sheet(s) can improve adhesion to a board core made from aqueous slurry of stucco containing calcium sulfate hemihydrate and high amounts of extraneous salts. Preferably the starch layer is a continuous starch layer disposed upon the entire inner surface of the back cover sheet. Optionally another starch layer is also disposed upon the entire inner surface of the front cover sheet. One or both of the cover sheets may be paper cover sheets, which may be the same or different paper materials. Optionally, additional starch and/or other additives may be present in the board core or aqueous gypsum slurry used to form the board core.

The board core may comprise a less dense region (layer) and further comprise one or more high-density regions (layers) in contact with the inner surface of the front paper cover sheet or the back paper cover sheet or a starch layer coated thereon.

When at least one starch layer is present in combination with a board core containing high amounts of extraneous salts, any of these boards may benefit from improved adhesion between the board core and the cover sheet(s), relative to a board which is the same but for lacking the starch layer. Accordingly, the present invention provides gypsum boards containing significant quantities of extraneous salts in a board core and methods for producing such gypsum boards using a gypsum source containing significant quantities of the extraneous salts. Thus, a starch layer coated upon at least one of the cover sheets may allow lower quality gypsum sources containing excessive extraneous salts to be used in forming a gypsum board. Such gypsum sources may otherwise be unsuitable for forming a gypsum board with sufficient adhesion between the board core and the cover sheets. Advantageously, the present invention addresses this issue.

Gypsum Board

Figure 1:
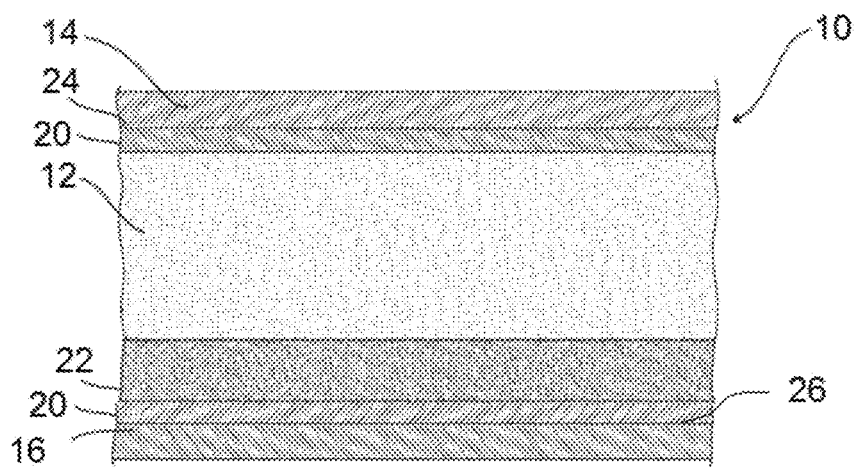
FIG. 1 shows a cross-sectional view of a gypsum board of the invention, in which a board core (gypsum core) is sandwiched between a front paper cover sheet and a back cover sheet, at least one of which is coated with a starch layer.

FIG. 1 depicts the wallboard panel 10 of the invention in which a gypsum core 12 (for example 0.5 inch thick) is sandwiched between a backer paper cover sheet (back cover sheet) 14 and a facer paper cover sheet (front cover sheet) 16, which may each be single-ply or multi-ply paper. The inner surface of the backer paper cover sheet 14 creates a bond side 24 of the backer paper cover sheet 14 which faces the gypsum core. The inner surface of the facer paper cover sheet 16 creates a bond side 26 which faces the gypsum core 12. The outer surface of the backer paper cover sheet 14 faces wall framing (see FIG. 3) of a room after the wallboard panel 10 is installed as an interior wall. The outer surface of the facer paper cover sheet 16 faces inside of a room after the wallboard panel 10 is installed as an interior wall.

A starch layer 20 lies on the backer sheet 14 bond side 24. An optional starch layer 20 lies on the facer paper cover sheet 16 bond side 26. An optional thin, dense gypsum layer 22 lies between the gypsum core 12 and the facer paper cover sheet 16 to contact the gypsum core 12 and the facer paper cover sheet 16. If the thin, dense gypsum layer 22 is present then the starch layer 20 is between the thin, dense gypsum layer 22 and the facer paper cover sheet 16. Another optional thin, dense gypsum layer (not shown) may lay between the gypsum core 12 and the backer paper cover sheet 14. Generally the gypsum core 12 and the thin, dense gypsum layer 22 have the same composition and are contiguous with one another. However, the core slurry (aqueous slurry) used for forming gypsum core 12 has been foamed and the aqueous slurry used for forming the thin, dense gypsum layer 22 has not been foamed so the thin, dense gypsum layer slurry is denser than the core slurry.

The starch layer 20 surprisingly increases the bonding performance between the gypsum core 12 and the backer sheet 14. The improved bonding performance can be particularly evident when the gypsum has a high salt concentration.

The starch layer is disposed upon the back paper in an amount ranging between about 0.5-15 lbs/MSF, preferably about 0.5-5 lbs/MSF, more preferably about 1-2 lbs/MSF (MSF=1000 square feet). The starch is used as a binding agent and can be native (uncooked) starch, pre-gelled starch, or a combination of native starch and pre-gelled starch.

Generally the relatively low-density interior region (gypsum core 12) and relatively high-density region (thin, dense gypsum layer 22) have the same composition and are contiguous with one another. However, low-density interior region may be formed from a gypsum slurry in a foamed state, whereas high-density region may be in formed from a gypsum slurry that is not foamed so that a denser layer forms. That is, the high-density region may have a lower porosity associated therewith than does the low-density interior region. Typically the thin, dense gypsum layer 22 is applied to an inner surface of a selected cover sheet. If the high-density region is also present on the selected cover sheet, then the starch layer 20 is between the cover sheet and the high-density region (thin, dense gypsum layer 22).

One or more chloride salts may be present in board core 12 of the present disclosure. If a high-density region (thin, dense gypsum layer 22) is included, the one or more chloride salts may also be present therein. Generally, the one or more chloride salts include any chloride salts from the stucco or other ingredient used to make the aqueous slurry for making the board.

The concentration of the chloride anion in the aqueous slurry used to make the board core 12 and, if present, the high-density region (thin, dense gypsum layer 22) may range from about 500 ppm to about 3000 ppm, typically from about 1000 ppm to about 3000 ppm, more typically from about 2000 ppm to about 3000 ppm, per 1,000,000 parts by weight calcium sulfate hemihydrate.

Methods for Manufacture

Various methods can be employed for preparing a gypsum board of the present invention from an aqueous gypsum slurry comprising calcium sulfate hemihydrate and a high amount of chloride salt. However, instead of a conventional gypsum source, a gypsum source containing the one or more chloride salts, as described above, may be substituted in the manufacturing process.

The base material from which gypsum wallboard and other gypsum products are manufactured is the hemihydrate form of calcium sulfate ($CaSO_4 \cdot \frac{1}{2}H_2O$), commonly termed "calcined gypsum" or "stucco," which is produced by heat conversion of the dihydrate form of calcium sulfate ($CaSO_4$).

The invention encompasses a method of making a gypsum board comprising:

preparing an aqueous slurry comprising a mixture of water and stucco, wherein the stucco comprises calcium sulfate hemihydrate, wherein the aqueous slurry comprises a mixture of:

at least 60 weight percent said calcium sulfate hemihydrate on a dry basis, about 500 ppm to about 3000 ppm chloride anions of per 1,000,000 parts by weight (pbw) said calcium sulfate hemihydrate, and the water at a weight ratio of water to the calcium sulfate hemihydrate of 0.2:1 to 1.2:1; and disposing the aqueous slurry between a front paper cover sheet and a back paper cover sheet to form a panel, each paper cover sheet having an inner surface and an outer surface;

wherein the inner surface of at least one of the front paper cover sheet and the back paper cover sheet is coated with a starch layer, wherein the gypsum slurry contacts the starch layer;

setting the calcium sulfate hemihydrate to form a panel comprising a gypsum core comprising calcium sulfate dihydrate; and drying the panel and cutting the panel into a gypsum board having one or more pre-determined dimensions.

Illustrative manufacturing techniques and equipment suitable for forming gypsum board according to the present invention can be found, for example, in U.S. Pat. No. 7,364,676 and U.S. Patent Application Publication 2010/0247937, each of which is incorporated herein by reference in its entirety. Briefly, such processes may involve discharging a cover sheet onto a moving conveyor. Since gypsum board is normally formed "face down," this cover sheet corresponds to facer paper cover sheet 16 upon completion of the fabrication process. The gypsum slurry can be made with a suitable water/calcium sulfate hemihydrate ratio for disposition onto the cover sheet.

To produce gypsum board, the stucco is mixed with water and additives to form an aqueous slurry which is continuously fed between continuous layers of paper on a board machine. One paper cover sheet is called the face paper sheet, or facer, and the other paper cover sheet is called the back paper sheet, or backer. As the board moves down a conveyer line to form a panel, the calcium sulfate recrystallizes or rehydrates, reverting to its original rock state. The paper becomes chemically and mechanically bonded to the board core layer as the gypsum sets. The panel is then cut to length and conveyed through dryers to remove any free moisture.

Dry and/or wet components of the gypsum slurry are fed to a mixer (e.g., a pin mixer), where they are agitated to form the gypsum slurry. The mixer comprises a main body and a discharge conduit (e.g., a gate-canister-boot arrangement as known in the art, or an alternative arrangement, such as that described in U.S. Pat. Nos. 6,494,609 and 6,874,930, which are incorporated herein by reference in their entirety). In some process configurations, the discharge conduit can include a slurry distributor with either a single feed inlet or multiple feed inlets, such as those described in U.S. Patent Application Publication 2012/0168527 and 2012/0170403, which are incorporated herein by reference in their entirety. When using a slurry distributor with multiple feed inlets, the discharge conduit can include a suitable flow splitter, such as those described in U.S. Patent Application Publication 2012/0170403. Foaming agent (typically soap) can be added in the discharge conduit of the mixer (e.g., in the gate as described, for example, in U.S. Pat. Nos. 5,683,635 and 6,494,609, which are incorporated herein by reference) or in the main body, if desired. Slurry discharged from the discharge conduit after all ingredients have been added, including foaming agent, is the primary gypsum slurry and is used to form the board core. This gypsum slurry is discharged onto the moving front cover sheet.

As described above, one or both of the cover sheets in a gypsum board may optionally be in interfacial contact with a high-density region or layer of the board core, also known as a skim coat. The skim coat may be contiguous with the board core after setting. In embodiments where foam is inserted into the discharge conduit, a stream of secondary gypsum slurry can be removed from the mixer body to provide a slurry for forming the skim coat. If present, the skim coat may be deposited onto the moving front paper cover sheet before the main portion of the gypsum slurry is deposited for forming the board core, with deposition of the skim coat usually occurring upstream of the mixer.

As described above, a starch layer is present on at least one cover sheet, particularly upon the back cover sheet, to increase adhesion thereto. The starch layer may be pre-coated to the inner surface of at least one of the front paper cover sheet and the back cover sheet. In the alternative the methods may further comprise applying the starch layer to the inner surface of at least one of the front paper cover sheet and the back cover sheet. The starch may be applied to the inner surface(s) as a continuous starch layer, as defined above. More particularly, the starch may be applied to the inner surface(s) of the front paper cover sheet and/or the back paper cover sheet in an amount from about 0.5-15 lbs./MSF, preferably about 0.5-5 lbs./MSF, more preferably about 1 lb/MSF to about 2 lbs/MSF. Suitable methods for applying the starch layer upon either the back paper cover sheet or the front paper cover sheet may include, for example, spraying, painting, inkjet printing, stenciling, stencil printing, roller coating, dip coating (immersion), or the like.

After mixing, the aqueous slurry optionally has foam added to decrease the product density. Foam is generated by combining soap and water. The foam is then injected into the aqueous slurry after it exits from the mixer through a hose or chute. The foam ring is an apparatus having multiple ports that are arranged in a ring perpendicular to the axis of the hose so that foam is forced under pressure into the aqueous slurry as it passes by the foam ring. Foam is typically added to the portion of slurry for the less dense core layer, but not for the portion of slurry for the skim coat.

When the foam and the slurry have been brought together, the resulting slurry moves toward and is poured onto a conveyor lined with one piece of facing material. Another piece of facing material is placed on top of the slurry, forming a sandwich assembly with the slurry between the two facing materials. The sandwich assembly is fed to a forming plate, the height of which determines the thickness of the board. Next the continuous sandwich assembly is cut into appropriate lengths at the cutting knife, usually eight feet to twelve feet. During this processing the slurry is allowed to harden (set) to form a board core comprising an interlocking crystalline matrix of set gypsum.

The boards are then moved to a kiln for drying. Temperatures in the kiln typically range from 450° F. to 500° F. maximum. Preferably there are three or more temperature zones in the kiln. In the first zone contacted by the wet board, the temperature increases to the maximum temperature, while the temperature slowly decreases in the last two zones. The blower for the first zone is positioned at the exit of the zone, blowing the air countercurrent to the direction of board travel. In the second and third zones, the blowers are located at the entrance to the zone, directing the hot air co-current with board travel. Heating that is less severe in the last zone prevents calcination of dry areas of the board, causing poor paper bond. A typical residence time in the kiln is about forty minutes, but the time will vary depending on the line capacity, the wetness of the board and other factors.

If a starch layer and a skim coat are both being applied to a cover sheet then the starch layer is coated upon the cover sheet(s) prior to deposition of the skim coat(s) thereon. As such, the starch layer is interposed between the skim coat (high-density region), if present, and the cover sheet. More particularly, the starch layer is in interfacial contact with the inner surface of the cover sheet and the skim coat, if present, is in interfacial contact with the starch layer. If a skim coat is not present in a given location, the board core is in interfacial contact with the starch layer. After drying the gypsum board to form set gypsum, as described above, the skim coat(s) become integral with a low-density region of the board core, such that a high-density region (layer) of the board core is in interfacial contact with back paper cover sheet or a starch layer coated thereon and/or with the front paper cover sheet or a starch layer disposed thereon.

The gypsum core (e.g., gypsum core 12 of FIG. 1) resulting from the set gypsum core slurry generally has a thickness of 0.25 inches to 1.5 inches and a density of 15 to 55 pounds/cubic foot. When foamed, the gypsum core resulting from the set foamed gypsum slurry has a total void volume of 10 to 92 volume percent, particularly 25 to 90 volume percent, and more particularly 30 to 85 volume percent. In contrast, the resulting skim layer, if present, has a total void volume of less than 30 volume percent.

Gypsum and Stucco (Calcined Gypsum)

The calcium sulfate hemihydrate (typically provided in the raw material known as stucco or calcined gypsum) component used to form the crystalline matrix of the gypsum panel core typically comprises beta calcium sulfate hemihydrate, water-soluble calcium sulfate anhydrite, alpha calcium sulfate hemihydrate, or mixtures of any or all of these, and obtained from natural or synthetic sources. In some aspects, the stucco may include non-gypsum minerals, such as minor amounts of clays or other components that are associated with the gypsum source or are added during the calcination, processing and/or delivery of the stucco to the mixer. The stucco can be fibrous or non-fibrous. Typically the raw stucco has at least 70 wt. % calcium sulfate hemihydrate, preferably at least 80 wt. % calcium sulfate hemihydrate, more preferably at least 85 wt. % calcium sulfate hemihydrate, and furthermore preferably at least 90 wt. % calcium sulfate hemihydrate.

Chloride Salts

The aqueous gypsum slurry for forming the gypsum board of the invention comprises water and stucco, wherein the aqueous gypsum slurry also contains chloride anions. The chloride anions may arise from one or more chloride salts from any source. Generally, the one or more chloride salts are present in the gypsum source used to form the core of the board of the invention. Thus, all or at least a majority of the one or more chloride salts may be introduced to the gypsum slurry from the source of gypsum that is used. The gypsum source may be a synthetic gypsum source, particularly a low-quality synthetic gypsum obtained from a power plant flue gas stream. Such a low-quality gypsum source may not otherwise be suitable for forming a wall board without using at least one starch layer, according to the present invention. The one or more chloride salts may also arise from impurities, such as one or more chloride salts, in water used to make the aqueous gypsum slurry.

Chloride salts are any salts which contain chloride. Thus, they include monovalent salts of chloride anion and a monovalent cation, such as sodium or potassium. Thus, they include divalent salts of chloride anions and a divalent cation, such as calcium or magnesium. Other chloride salts, are also contemplated, such as trivalent salts of chloride anions and a trivalent cation.

The concentration of the chloride anions of the one or more chloride salts in the aqueous slurry used to make the board core and, if present, the high-density region (thin, dense gypsum layer) of the invention may range from about 500 ppm to about 3000 ppm, typically from about 1000 ppm to about 3000 ppm per 1,000,000 parts by weight calcium sulfate hemihydrate, more typically from about 2000 ppm to about 3000 ppm per 1,000,000 parts by weight calcium sulfate hemihydrate.

Starch

Various starches can be used for the starch layer of the invention and, if desired also added to the aqueous gypsum slurry. However, the aqueous gypsum slurry may have an absence of starch.

The starch layer can be wet or dry (pre-coated) when it contacts the gypsum core or, if present the dense gypsum layer. The gypsum core is not set by the time the starch layer contacts it.

The starch layer has an absence of gypsum, inorganic filler, organic filler, and latex or other polymer. The starch layer consists essentially of starch and water, but can optionally have a small amount of STMP.

Either of starch layers (for example, starch layer 20) may be a continuous starch layer contacting, at least 90% or preferably 100%, of the inner surface of back paper cover sheet 14 or front paper cover sheet 16. A starch layer 20 that is "continuous" refers to the layer having a substantial lack of discontinuities upon the inner surface of back paper cover sheet 14 or front paper cover sheet 16. That is, starch is disposed as layer upon all or nearly all (over 90%) of back paper cover sheet 14 or front paper cover sheet 16. Alternately, when starch layer 20 is continuous, no layer patterning is present. Accordingly, suitable methods for applying starch layer 20 upon either back paper cover sheet 14 or front paper cover sheet 16 may include, for example, spraying, painting, inkjet printing, stenciling, stencil printing, roller coating, dip coating (immersion), or the like. Starch layer 20 may be pre-coated upon back paper cover sheet 14 or front paper cover sheet 16 before contacting a gypsum slurry. The starch in starch layer 20 may be either wet or dry when contacted with the gypsum slurry. As described below, the gypsum is in a wet state when contacted with starch layer 20 in order to form a more effective bond thereto. That is, the gypsum slurry is contacted with starch layer 20 prior to setting of the gypsum to form board core 12.

The starch in starch layer 20 can be a pre-gelatinized (cooked) starch and/or an uncooked starch. In this regard, starches are classified as carbohydrates and contain two types of polysaccharides: linear amylose and branched amylopectin. Starch granules are semi-crystalline, e.g., as seen under polarized light, and are insoluble in water at room temperature or near room temperature. Uncooked starches are characterized as being cold water insoluble and having a semi-crystalline structure. Typically, uncooked starches are obtained by wet milling and are not modified by heating wet starch as in the case of cooked starches. Pre-gelatinized, or cooked, starches are characterized as being cold water soluble and having a non-crystalline structure.

Uncooked starch may be provided as a suspension (dispersion) of up to 50 wt. % starch solids in the water. Cooked starch is a solution limited to at most 10 wt. % solids dissolved in the water. There is at most 50 wt. % total cooked starch and uncooked starch in the starch dispersion. A blend of water with cooked starch and uncooked starch is helpful because the cooked starch helps keep the uncooked starch in suspension. However, the invention can use solely uncooked starch if the starch suspension is mixed very soon after mixing with water. Preferably the starch suspension contains 0.5 to 5 wt. % cooked starch, more preferably 1-3 wt. % cooked starch. The starch and water may optionally further include STMP (sodium trimetaphosphate) in an amount ranging between 0-10 wt. %, preferably 3 wt. %, of the starch solids.

Native (uncooked) starch is preferred. A starch gel may be prepared by dispersing starch particles in water. Without pre-cooking the starch, it may form a gel during the drying process.

Uncooked starch generally has a higher bulk density with less variability than found in pre-gelatinized starch. This is useful because, for example, consistent density allows a volumetric feeder to add starch more accurately and consistently. For example, the bulk density of the starch in pounds per cubic foot (pcf) can be from about 35 pcf to about 50 pcf, from about 35 pcf to about 45 pcf, from about 37 pcf to about 50 pcf, from about 37 pcf to about 45 pcf, from about 40 pcf to about 50 pcf, from about 40 pcf to about 47 pcf, from about 40 pcf to about 45 pcf, from about 41 pcf to about 45 pcf, and the like.

Uncooked starches typically are in native, granular form. Peak viscosity of uncooked starches may relate to average molecular weight of starch. The granular, uncooked form of starch can undergo at least some degree of gelatinization during the manufacturing process for the gypsum board (e.g., during kiln drying).

Where uncooked starch is used, the uncooked starch can have a mid-range molecular weight, indicated by a peak viscosity from about 100 BU to about 900 BU. The peak viscosity of the uncooked starch may be determined according to the following method. The Brabender peak viscosity is measured using a Viscograph-E (C. W. Brabender) set to 75 rpm; 700 cmg. For viscosity measurement, the starch is in a slurry having a concentration of 15% solids in water.

The starch slurry is heated from 25° C. to 95° C. at a rate of 3° C./min. It is then held at 95° C. for 10 min until being cooled 50° C. at a rate of −3° C./min.

Typically, the peak viscosity of uncooked starch having a mid-range molecular weight can be from about 100 Brabender Units to about 850 Brabender Units, from about 120 Brabender Units to about 875 Brabender Units, from about 250 Brabender Units to about 750 Brabender Units, from about 400 Brabender Units to about 700 Brabender Units, from about 100 Brabender Units to about 460 Brabender Units, from about 100 Brabender Units to about 300 Brabender Units, from about 500 Brabender Units to about 850 Brabender Units, or from about 550 Brabender Units to about 850 Brabender Units.

Properties of uncooked starches include having low viscosity in cold water (i.e., at a temperature of 77° F. (25° C.)), in contrast to the properties of pre-gelatinized starches, include having instant high viscosity in cold water. Uncooked starches according to the invention can have any suitable cold water viscosity. Typically, the cold water viscosity is from about 1 centipoise to about 500 centipoise, e.g., from about 1 centipoise to about 400 centipoise, from about 1 centipoise to about 300 centipoise, from about 1 centipoise to about 200 centipoise, or from about 1 centipoise to about 100 centipoise. If desired, uncooked starch can have a cold water viscosity of about 50 centipoise or less, e.g., about 40 centipoise or less, about 30 centipoise or less, about 20 centipoise or less, or about 10 centipoise or less in cold water (e.g., from about 1 centipoise to about 50 centipoise, from about 1 centipoise to about 40 centipoise, from about 1 centipoise to about 30 centipoise, from about 1 centipoise to about 20 centipoise, from about 5 centipoise to about 50 centipoise, from about 5 centipoise to about 30 centipoise, from about 5 centipoise to about 20 centipoise, and the like).

The cold water viscosity may be measured using to a Brookfield viscometer method with a testing profile as follows. Starch (20 g, dry) is added into water (180 g) in a Waring blender (model 31BL92) while mixing at low speed for 15 seconds. Starch solution (200 g) is transferred into a measuring cup. No. 2 paddle and 60 RPM are selected. The viscosity value measured at 20 seconds is used as the viscosity of the starch.

As used herein, the term "uncooked" also means that the starch has a degree of gelatinization of less than about 5% (e.g., less than about 3%, or less than about 1%, including 0%) before being disposed as a starch layer. The uncooked starch can be partially or fully gelatinized when exposed to elevated temperature in the gypsum board manufacturing process, e.g., in the kiln used for the drying step to remove excess water from the board core.

Cooked (pre-gelatinized) starches can be prepared in any suitable manner, e.g., in an extruder as described in U.S. Patent Application Publication 2015/0010767, which is incorporated herein by reference in its entirety. The cooked starch can be prepared to have any desired properties (e.g., viscosity, cold water solubility, cold water viscosity, and the like).

Cooked starches can be prepared by heating wet starch, and can be prepared, e.g., by extrusion techniques, such as described in U.S. Patent Application Publications 2015/0010767, 2014/0113128, and 2014/011312, each of which is incorporated herein by reference in its entirety. Cooked starches are referred to as pre-gelatinized starches since the crystalline structure of the starch granules melts, and results in starch gelatinization, which is characterized by the disappearance of birefringence under a microscope with a polarized light. Gelatinization is the process during which the starch is placed in water and heated ("cooked") such that the crystalline structure of the starch granules transforms as the starch is melted, after which the starch molecules can dissolve in water such that a good dispersion results. It has been found that, when transforming starch granules to their gelatinized form, initially the starch granules provide little viscosity in water because the starch granules are water insoluble. As the temperature increases, the starch granules swell and the crystalline structure converts as the starch melts at the gelatinization temperature. The peak viscosity is when the starch granules have maximum swelling. Further heating breaks down the starch granules and dissolves the starch molecules in water, with a precipitous reduction in viscosity. After cooling, the starch molecules can re-associate to form a 3-D gel structure, with the viscosity increasing due to the presence of the gel structure.

Examples of starches that may be suitable for use in the gypsum boards and associated methods herein include, but are not limited to, one or more of native cereal starches, native root starches, native tuber starches, and/or chemically modified starches, with specific representative examples including, e.g., corn starch (normal, waxy, and/or high-amylose), A type wheat starch, B type wheat starch, pea starch, substituted/functionalized starches having substituent groups (such as acetate, phosphate, hydroxyethyl, hydroxypropyl, alkylsulfonate, and the like) on starch hydroxyl groups, or any combination thereof.

Starch, whether uncooked and/or cooked, can have any suitable viscosity. The particular viscosity of the starch can support formation of a specified thickness in the starch layer(s). Typically, one or more of a pre-gelatinized starch having a mid-range viscosity of about 20 centipoise to about 700 centipoise (as measured according to the VMA method) or an uncooked starch of peak viscosity from about 100 Brabender Units to about 900 Brabender Units, as measured according to the methodology described herein, can be used. The viscosity characteristic is determined as the starch is placed under certain conditions according to the respective viscosity measurement methodologies described herein, but it will be understood that the starch need not be incorporated into the gypsum board under these conditions.

To reduce peak viscosities of uncooked or cooked starches, the starch molecules can be modified, e.g., to hydrolyze glycosidic bonds between glucose units to achieve a desired molecular weight. For example, such modifications can include acid modifications, enzyme modifications, pyrolysis, and/or other methods. The most commonly used starch converting enzyme is α-amylase (alpha-amylase). The enzymatic hydrolysis reaction can be stopped either by adjusting the pH or by heating. To prepare acid-modified starches, it will be appreciated that an aqueous suspension of unmodified starch can be treated with, e.g., a small quantity of acid, particularly a strong acid such as hydrochloric acid, sulfuric acid, nitric acid, hydrofluoric acid, or the like. By adjusting the reaction time, the degree of depolymerization can be modified to a desired extent. For example, when the proper fluidity is achieved, e.g., as determined by in-process laboratory controls, mild alkali may be introduced to neutralize the acid and stop the hydrolysis. Thus, acid-modified starches can be prepared in various fluidities (viscosities). Also, some acid-modified starches may be used directly after neutralization without further purification or may be purified to remove salts. The end use of an acid-modified starch may determine the desirability of purification. For example, a starch modified by sulfuric acid and neutralized by calcium hydroxide may contain sulfate and calcium ions which can be added to a stucco and water slurry, or contacted with the slurry, since those ions are already present from the stucco. Thus, considerations to determine the desirability for purification of an acid-modified starch include, for example, the identity of the acid and alkali base and whether introduction of the particular ions formed therefrom may be tolerated in a given location. For example, it may be desirable to avoid introducing excessive quantities of alkali metal or alkaline earth metal halides with the starch, and purification may be advantageous in such situations.

A suitable pre-gelatinized starch may include, but is not limited to, pre-gelatinized corn flour, for example, pre-gelatinized corn flour available from Bunge, St. Louis, Mo., having the following typical analysis: moisture 7.5%, protein 8.0%, oil 0.5%, crude fiber 0.5%, ash 0.3%; having a green strength of 0.48 psi; and having a loose bulk density of 35.0 lbs/ft$^3$. Other useful pre-gelatinized starches may include, but are not limited to, pre-gelatinized rice starch and pre-gelatinized wheat starch.

Pre-gelatinized starches can have any suitable viscosity. The viscosity of a pre-gelatinized starch may be characterized as having a "mid-range" viscosity (i.e., having a viscosity from about 20 centipoise to about 700 centipoise) when the pre-gelatinized starch is subjected to conditions according to the VMA method with the pre-gelatinized starch in water in an amount of 15% by weight of the total weight of the pre-gelatinized starch and water.

Typically, the viscosity of a suitable pre-gelatinized starch can be from about 20 centipoise to about 1,000 centipoise, e.g., from about 20 centipoise to about 900 centipoise, from about 20 centipoise to about 800 centipoise, from about 20 centipoise to about 700 centipoise, from about 20 centipoise to about 500 centipoise, from about 30 centipoise to about 200 centipoise, or from about 100 centipoise to about 700 centipoise. Examples include, but are not limited to, pre-gelatinized corn starches, e.g., having a viscosity of about 773 centipoise or 100 centipoise, as measured according to the VMA method set forth in U.S. Patent Application Publication 2012/0113124, which is incorporated herein by reference in its entirety.

Typically, a pre-gelatinized starch can be prepared to have desired cold water solubility. Conventional pre-gelatinization techniques involve making the starch cold water soluble and generally require cooking the starch in an excess amount of water. Extrusion allows for a combination of heating and mechanical shearing, and is an energy efficient method that can be used to produce pre-gelatinized starch in a one step process having a low moisture content with cold water solubility. Cold water solubility is defined as having any amount of solubility in water at room temperature (about 25° C.). Cold water soluble starches can have a cold water solubility greater than about 30% and can increase the strength of the gypsum board. The solubility of the pre-gelatinized starch in water is defined as the amount of starch that dissolves in room temperature water divided by the total amount of starch.

Typically, the cold water solubility of pre-gelatinized starch may be from about 30% to about 100%. In more specific examples, the cold water solubility of pre-gelatinized starch can be from about 50% to about 100%.

Typically, pre-gelatinized starch may have a cold water viscosity (10% solids, 25° C.) of about 10 BU to about 120 BU, measured according to the Brabender method, e.g., from about 20 BU to about 110 BU, from about 30 BU to about 100 BU, or from about 60 BU to about 70 BU. According to the Brabender viscosity measurement procedure as referred to herein, viscosity is measured using a C. W. Brabender Viscograph, e.g., a Viscograph-E that uses reaction torque for dynamic measurement. It is to be noted that, as defined herein, the Brabender units (BU) are measured using a sample cup size of 16 fl. oz. (about 500 cc), with a 700 cmg cartridge at an RPM of 75. One having ordinary skill in the art also will readily recognize that the Brabender units can be converted to other viscosity measurements, such as centipoise (e.g., cP=BU×2.1, when the measuring cartridge is 700 cmg) or Krebs units, as described therein.

The starch layer(s) within the gypsum boards of the present invention may comprise uncooked starch. Or, the starch layer(s) may comprise a mixture of uncooked starch and cooked starch. The ratio of uncooked starch to cooked starch may be selected, for example, to provide a desired degree of flowability for application of the starch to the inner surface(s) of the back paper cover sheet and/or the front cover sheet, particularly the back cover sheet, more particularly a back paper cover sheet. The chosen flowability may be dependent upon the technique by which the starch is applied to the inner surface of the cover sheet(s). Flowability can be measured, e.g., by a slump test. Flowability can be associated with viscosity of the starch or starch mixture, for example, from about 50 cps to about 2000 cps, e.g., from about 200 cps to about 1500 cps, as measured according to the Brookfield viscometer test at 60 rpm with No. 5 Spindle.

Any suitable proportion of uncooked starch to cooked starch may be included in the starch layer(s), e.g., 0:100 to 100:0 (since the combination is optional), or 1:100 to 100:1. The ratio of uncooked to cooked starch may be from about 90:10 to about 10:90, from about 70:30 to about 30:70, from about 60:40 to about 40:60, from about 90:10 to about 60:40, from about 90:10 to about 70:30, from about 90:10 to about 80:20, from about 80:20 to about 60:40, from about 80:20 to about 70:30, or the like. If desired, the ratio of uncooked starch to cooked starch can be about 25:75, about 30:70, about 35:65, about 50:50, about 65:35, about 70:30, about 75:25, and the like.

A combination of cooked starch and uncooked starch may be dry mixed or wet mixed for application to the inner surface(s) of the back paper cover sheet and/or the front cover sheet. Similarly, cooked or uncooked starch alone may be applied dry or wet to the inner surface(s) of the back paper cover sheet and/or the front cover sheet. A combination of cooked and uncooked starch may be applied to the inner surface(s) at the same time or one at a time. The cooked and uncooked starches may be admixed with one another in the starch layer, or the cooked and uncooked starches may themselves be layered upon themselves in any order.

The starch in the starch layer(s) is generally a non-migrating starch. In this respect, migratory acid-modified starches are different than the starches present in the starch layer(s) and are known in the art as having smaller molecular chains. These smaller chained migratory starches can generally migrate within a gypsum slurry but are not beneficial for enhancing board strength. Acid-modified migratory starches have molecular weights that are typically below about 6,000 Daltons. Typically starches for incorporation within the starch layer(s) in of the invention have higher molecular weights than migratory starches, e.g., at least about 15,000 Daltons, or at least about 30,000 Daltons. The average molecular weight may be indicated by the peak viscosity.

Any suitable amount of starch may be present in the starch layer(s). For example, the starch layer(s) may include an amount of starch ranging from, for example, about 0.1 lbs/MSF (MSF=1000 square feet) to about 35 lbs/MSF, such as from about 1 lb/MSF to about 2 lbs/MSF, or from about 2 lbs/MSF to about 35 lbs/MSF, or from about 1 lb/MSF to about 5 lbs/MSF, or from about 6 lbs/MSF to about 20 lbs/MSF.

In particular examples, the starch layer(s) in the gypsum boards of the invention have an absence of gypsum, inorganic filler, organic filler, and latex or other synthetic polymers. In some instances, the starch layer(s) may consist essentially of starch and water, optionally with a small amount of sodium trimetaphosphate (STMP).

Organic functionalized starches may be used in the starch layer(s) within any of the gypsum boards disclosed herein. Organic functionalized starches may be formed through reaction of any of the hydroxyl groups in the glucose monomer units of the starch, but may be more readily introduced to the primary alcohol group at C-6. Functional groups that may be introduced include, but are not limited to, acetate, phosphate, hydroxyalkyl, alkylsulfonate, and the like.

Sulfonated starches suitable for use the gypsum boards of the present disclosure may be synthesized through known sulfonation techniques. Sulfonation introduces a sulfonic acid ($-SO_2OH$) or sulfonate salt ($-SO_3^-Na^+$) moiety to the starch. In an illustrative sulfonation process, starch may be reacted with the sodium salt of vinyl sulfonic acid at 90° C. for 4 hours in aqueous NaOH to produce an alkyl-linked sulfonate salt.

More generally, a sulfonic acid or sulfonate salt may be linked to the starch with an alkyl group or an arylalkyl group, particularly a $C_2$-$C_{18}$ or a $C_2$-$C_8$ sulfonic acid or sulfonate salt, more particularly a $C_2$-$C_5$ alkyl sulfonic acid or sulfonate salt. Coupling of the sulfonic acid to the sulfonic acid or sulfonate salt through an alkyl or arylalkyl group may occur in the presence of a suitable base, such as 10% sodium hydroxide (NaOH). Suitable sulfonating agents may include, but not limited to, sodium vinyl sulfonate, styrene sulfonate, 2-chloroethanesulfonic acid, 3-chloropropanesulfonic acid, or 1,3-propane sultone. While the sulfonation may be carried out at a temperature of from about 50° C. to about 100° C., it may be performed at a temperature of about 75° C. to about 95° C., particularly at a temperature of about 85° C. to 95° C.

Additives

Other additives that may be present in the gypsum slurry used to form the board core may include, but are not limited to, strengthening agents, foam (prepared from a suitable foaming agent), dispersants, polyphosphates (e.g., sodium trimetaphosphate), starches, retarders, accelerators, recalcination inhibitors, binders, adhesives, secondary dispersing aids, leveling or non-leveling agents, thickeners, bactericides, fungicides, pH adjusters, buffers, colorants, reinforcing materials, fire retardants, water repellants (for example siloxane), fillers, and mixtures thereof.

Additives and other components of the gypsum slurry may be added to the mixer in various ways. For example, various combinations of components may be pre-mixed before entering the mixer, either as one or more dry components and/or as one or more wet components. Singular components may similarly be introduced to the mixer in wet or dry form. If introduced in a wet form, the components may be included in a carrier fluid, such as water, in any suitable concentration.

Fibers can optionally be used in the methods and composition of the present invention. The fibers may include mineral fibers (also known as mineral wool), glass fibers, carbon fibers, and mixtures of such fibers, as well as other comparable fibers providing comparable benefits to the wallboard. For example, glass fibers can be incorporated in the gypsum core slurry and/or the skim layer slurry and resulting crystalline core structure. The glass fibers in such aspects may have an average length of about 0.5 to about 0.75 inches and a diameter of about 11 to about 17 microns. In other aspects, such glass fibers may have an average length of about 0.5 to about 0.675 inches and a diameter of about 13 to about 16 microns. In yet other aspects, E-glass fibers are utilized having a softening point above about 800° C. or above at least about 900° C. Mineral wool or carbon fibers such as those known to those of ordinary skill may be used in place of or in combination with glass fibers.

Fibers, when included, can be present in the gypsum core slurry and/or the skim layer slurry in amounts on a dry basis per 100 pbw of calcium sulfate hemihydrate of about 0.5 to about 10 pbw; preferably about 1 to about 8 pbw; more preferably about 2 to about 7 pbw; and most preferably about 3 to about 6 pbw. There may also be an absence of fibers.

Optionally, one or more phosphate-containing compounds can also be included in the slurry, if desired. For example, these phosphate-containing components can include water-soluble components and can be in the form of an ion, a salt, or an acid, namely, condensed phosphoric acids, each of which comprises two or more phosphoric acid units; salts or ions of condensed phosphates, each of which comprises two or more phosphate units; and monobasic salts or monovalent ions of orthophosphates as well as water-soluble acyclic polyphosphate salts. Illustrative examples are described in U.S. Pat. Nos. 6,342,284; 6,632,550; 6,815,049; and 6,822,033, which are incorporated herein by reference in their entirety.

Phosphate-containing components can enhance green strength, resistance to permanent deformation (e.g., sag), dimensional stability, and the like. Trimetaphosphate compounds can be used, including, for example, sodium trimetaphosphate, potassium trimetaphosphate, lithium trimetaphosphate, and ammonium trimetaphosphate. Sodium trimetaphosphate (STMP) is commonly used, although other phosphates may be suitable, including for example sodium tetrametaphosphate, sodium hexametaphosphate having from about 6 to about 27 repeating phosphate units and having the molecular formula $Na_{n+2}P_nO_{3n+1}$ wherein n=6-27, tetrapotassium pyrophosphate having the molecular formula $K_4P_2O_7$, trisodium dipotassium tripolyphosphate having the molecular formula $Na_3K_2P_3O_{10}$, sodium tripolyphosphate having the molecular formula $Na_5P_3O_{10}$, tetrasodium pyrophosphate having the molecular formula $Na_4P_2O_7$, aluminum trimetaphosphate having the molecular formula $Al(PO_3)_3$, sodium acid pyrophosphate having the molecular formula $Na_2H_2P_2O_7$, ammonium polyphosphate having 1000-3000 repeating phosphate units and having the molecular formula $(NH_4)_{n+2}P_nO_{3n+1}$ wherein n=1000-3000, or polyphosphoric acid having two or more repeating phosphoric acid units and having the molecular formula $H_{n+2}P_nO_{3n+1}$ wherein n is two or more.

The phosphates usually are added in a dry form and/or an aqueous solution liquid form, with the dry ingredients added to the slurry mixer, with the liquid ingredients added to the mixer, or in other stages or procedures.

When present, the phosphate can be included in the gypsum slurry in a dry form or in a form in water (e.g., a phosphate solution from about 5% to about 20%, such as about a 10% solution). If included, the phosphate can be present in any suitable amount (solids/solids basis), such as from about 0.01% to about 0.5% by weight of the stucco, e.g., from about 0.03% to about 0.4%, from about 0.1% to about 0.3%, or from about 0.12% to about 0.4% by weight of the stucco. There may be an absence of phosphate.

The gypsum slurry can optionally include at least one dispersant to enhance fluidity. The dispersant(s) may be introduced to the gypsum slurry in a dry form, optionally with other additives, and/or in a liquid form, optionally with other liquid components. Examples of suitable dispersants include naphthalene sulfonates, such as polynaphthalene sulfonic acid and its salts (polynaphthalenesulfonates) and derivatives, which are condensation products of naphthalenesulfonic acids and formaldehyde, as well as polycarboxylate dispersants, such as polycarboxylic ethers, for example. Other examples of suitable dispersants include lignosulfonates or sulfonated lignin. Lignosulfonates are water-soluble anionic polyelectrolyte polymers, which are byproducts from the production of wood pulp using sulfite pulping.

Lower molecular weight dispersants may be desirable. Lower molecular weight naphthalene sulfonate dispersants may be favored because they trend to a lower water demand than higher viscosity, higher molecular weight dispersants. Thus, molecular weights from about 3,000 to about 10,000 (e.g., about 8,000 to about 10,000) may be desirable molecular weights for a dispersant. If desired, the molecular weight of the polycarboxylate dispersants can be from about 20,000 to about 60,000, which may exhibit less retardation than dispersants having molecular weights above about 60,000.

Typical naphthalenesulfonates are a naphthalene sulfonate solution in water, having a range of about 35% to about 55% by weight naphthalenesulfonate solids content. However, if desired the naphthalenesulfonates can be used in dry solid or powder form.

When present, the dispersant can be included in the gypsum slurry in any suitable (solids/solids) amount, such as, for example, about 0.1% to about 5% by weight of the stucco, e.g., about 0.1% to about 4%, about 0.1% to about 3%, about 0.2% to about 3%, about 0.5% to about 3%, about 0.5% to about 2.5%, about 0.5% to about 2%, about 0.5% to about 1.5%, or the like. There may also be an absence of any one or more of polynaphthalenesulfonates, polycarboxylic ethers or lignosulfonates.

Accelerators and/or retarders may be added to the gypsum core slurry and/or the skim layer slurry to modify the rate at which the calcium sulfate hemihydrate hydration reactions take place. Suitable accelerators may include, for example, wet gypsum accelerator, heat resistant accelerator (HRA), or climate stabilized accelerator (CSA). "CSA" is a set accelerator including 95% calcium sulfate dihydrate co-ground with 5% sugar and heated to 250° F. (121° C.) to caramelize the sugar. CSA is available from USG Corporation and is made according to U.S. Pat. Nos. 3,573,947 and 6,409,825, herein incorporated by reference. Potassium sulfate is another preferred accelerator. HRA (Heat Resistant Accelerator), which is a preferred accelerator, is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators. When present, the accelerator and/or retarder each can be incorporated in the gypsum slurry in an amount on a solid basis of, e.g., about 0% to about 10% by weight of the stucco (e.g., about 0.1% to about 10%), such as, for example, from about 0% to about 5% by weight of the stucco (e.g., about 0.1% to about 5%). Suitable accelerators may include, for example, calcium sulfate dihydrate, carbohydrate-coated calcium sulfate, calcium sulfate dihydrate/organic phosphonate, and calcium sulfate dihydrate/organic phosphate. There may also be an absence of accelerators and/or retarders.

Foam (also known as foam water) may optionally be introduced into the gypsum core slurry and/or the skim layer slurry (preferably the gypsum core slurry) in amounts that provide the above mentioned reduced core density and panel weight. The foaming agent to produce the foam is typically a soap or other suitable surfactant. The introduction of foam in the gypsum core slurry in the proper amounts, formulations, and process will produce a desired network and distribution of voids within the core of the final dried wallboards. This void structure permits the reduction of the gypsum and other core constituents and the core density and weight, while maintaining desired panel structural and strength properties. If present, foaming agents may comprise a major weight portion of unstable component and a minor weight portion of stable component (e.g., where unstable and blend of stable/unstable are combined). The weight ratio of unstable component to stable component is effective to form an air void distribution within the set gypsum core, as described in U.S. Pat. Nos. 5,643,510; 6,342,284; and 6,632,550, which are incorporated herein by reference in their entirety. The approaches for adding foam to a gypsum core slurry are known in the art and one example of such an approach is discussed in U.S. Pat. No. 5,683,635, the disclosure of which is incorporated by reference herein. Evaporative water voids, generally having voids of about 5 μm or less in diameter, also contribute to the total void distribution along with the aforementioned air (foam) voids. The volume ratio of voids with a pore size greater than about 5 microns to the voids with a pore size of about 5 microns or less, is from about 0.5:1 to about 9:1, such as, for example, about 0.7:1 to about 9:1, about 1.8:1 to about 2.3:1, or the like. The foaming agent is present in the gypsum slurry in an amount, for example, of less than about 0.5% by weight of the stucco, such as about 0.01% to about 0.5%, about 0.01% to about 0.2%, about 0.02% to about 0.4%, about 0.02% to about 0.2%, about 0.01% to about 0.1%, or the like. There may also be an absence of foaming agents.

Components for fire and/or water resistance can also be included in the gypsum slurry. Examples include, for instance, siloxanes (water resistance); fiber; heat sink additives such as aluminum trihydrite (ATH), magnesium hydroxide or the like; and/or high expansion particles (e.g., expandable to about 300% or more of original volume when heated for about one hour at 1560° F.). Further disclosure on such additives may be found in U.S. Pat. No. 8,323,785, which is incorporated by reference in its entirety. High expansion vermiculite may be included, although other fire resistant materials can be included. If present, fire or water resistance additives can be included in any suitable amount as desired depending, e.g., on fire rating, and like performance parameters. For example, if included, the fire or water resistance additives can be individually present in an amount from about 0.5% to about 10% by weight of the stucco, such as from about 1% to about 10%, about 1% to about 8%, about 2% to about 10%, about 2% to about 8%, or the like. If included, the siloxane may desirably be introduced in the form of an emulsion. The slurry may then be shaped and dried under conditions which promote the polymerization of the siloxane to form a highly crosslinked silicone resin. A catalyst which promotes the polymerization of the siloxane to form a highly crosslinked silicone resin can be added to the gypsum slurry. Solventless methyl hydrogen siloxane fluid can be used as the siloxane. This product is a siloxane fluid containing no water or solvents. It is contemplated that about 0.3% to about 1.0% of the siloxane may be used if desired, based on the weight of the dry ingredients. For example, if desired, about 0.4% to about 0.8% siloxane may be present in the gypsum slurry based on the dry stucco weight. There may also be an absence of any one or more of these components for fire and/or water resistance. For example, there may be an absence of siloxane.

Water

Water is added to the slurry in any amount that makes a flowable slurry. The amount of water to be used varies greatly according to the application with which it is being used, the exact dispersant being used, the properties of the calcium sulfate hemihydrate, and the additives being used.

Water used to make the slurry should be as pure as practical for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practical.

The water can be present in the gypsum core slurry and/or the skim layer slurry of the present invention at a weight ratio of water to calcium sulfate hemihydrate of about 0.2:1 to about 1.2:1; preferably, about 0.3:1 to about 1.1:1; more preferably, about 0.6:1 to about 1:1; most preferably 0.7:1 to 0.95:1; and typically about 0.85:1.

Back Paper Cover Sheet and the Front Paper Cover Sheet

The back paper cover sheet and the front cover sheet may be made from any suitable paper material having any suitable basis weight.

The back and front cover sheets are made of paper. However, the paper materials for each cover sheet may be the same or different.

Various paper grades can be used in gypsum panels, including Manila grade paper with a smooth calendared finish is often used as the facer paper cover sheet, and Newsline paper with a rougher finish is often used as the backer paper cover sheet. Typically both paper grades are multi-ply with at least one liner ply and several filler plies. However, if desired at least one paper cover sheet or both paper cover sheets are made of single-ply paper.

If desired, to enhance strength (e.g., nail pull strength), especially for lower density gypsum boards, one or both of the cover sheets can be formed from paper having a basis weight of, for example, at least about 45 lbs/MSF (e.g., from about 45 lbs/MSF to about 65 lbs/MSF, about 45 lbs/MSF to about 60 lbs/MSF, about 45 lbs/MSF to about 55 lbs/MSF, about 50 lbs/MSF to about 65 lbs/MSF, about 50 lbs/MSF to about 60 lbs/MSF, or the like). If desired, the front paper cover sheet may have a higher basis weight than does the back cover sheet, which may provide enhanced nail pull resistance and handling. The back paper cover sheet can have a somewhat lower basis weight if desired (e.g., a basis weight of less than 45 lbs/MSF, e.g., from about 33 lbs/MSF to 45 lbs/MSF (e.g., about 33 lbs/MSF to about 40 lbs/MSF).

In addition, if desired, the back paper cover sheet may be a paper sheet which contains a plurality of perforations. Surprisingly, perforations within the paper back paper cover sheet may increase the adhesion between the board core and the cover sheet. Without being bound by theory or mechanism, it is believed that the perforations provide a conduit for outward migration of chloride salts released from the board core that would otherwise detrimentally aggregate at the interface between the board core and the cover sheets. Thus, perforation may offer a complementary mechanism to the starch coatings described herein for affecting improved adhesion. For example, the starch layer may be applied between the gypsum core and the front paper cover sheet to improve adhesion of the front paper cover sheet and the back paper cover sheet could be provided with the perforations to improve the adhesion of the back cover sheet. Also for example, the starch layer may be applied between the gypsum core and the front paper cover sheet and/or back paper cover sheet to improve adhesion of the respective sheet and the back paper cover sheet could be provided with the perforations to improve the adhesion of the back cover sheet. Illustrative equipment for perforating one or more of the cover sheets in gypsum board in a manner consistent with the present disclosure is described in U.S. Patent Application Publication 2018/0065336, which is incorporated herein by reference in its entirety.

The perforations in the back paper cover sheet may be present as a shape, size, and perforation density suitable to support drying and/or increased adhesion in the gypsum board.

Typically, the perforations have a substantially circular shape. It is to be appreciated, however, that the perforations may have alternative geometric shapes such as oval, triangular, square, rectangular, or the like. Any combination of circular and non-circular perforations may be present, depending on the requirements for a particular application. Any combination of non-circular perforations may be present.

Each of the perforations within the cover sheet(s), particularly the back cover sheet may define an opening having a size that ranges from about 0.005 inches to about 0.1 inches in its largest transverse dimension, preferably from about 0.01 inches to about 0.1 inches in size, and more preferably from about 0.01 inches to about 0.02 inches in size. The term "largest transverse dimension" represents the largest dimension measured across each perforation within the plane of the cover sheet(s). For circular perforations, the largest transverse dimension represents diameter of a circular opening.

The perforation coverage density refers to the number of perforations per unit area in the back cover sheet. The perforation density within the cover sheet(s) may be about 5 to about 50 perforations/in$^2$, preferably about 12 to about 25 perforations/in$^2$, for example about 10 to about 15 perforations/in$^2$, or for example about 15 to about 20 perforations/in$^2$.

If a perforated back paper cover sheet is employed, then in the method for making the gypsum board, when the foam and the slurry have been brought together, the resulting slurry moves toward and is poured onto a conveyor lined with a first piece of facing material which is the front paper cover sheet (facer paper cover sheet). Another piece of facing material which is the perforated back paper cover sheet (backer paper cover sheet) is placed on top of the slurry, forming a sandwich assembly with the slurry between the two facing materials.

Typically the perforations are 0.1 to 10%, more typically 0.5 to 5% of the surface of the back cover sheet.

Figure 2:
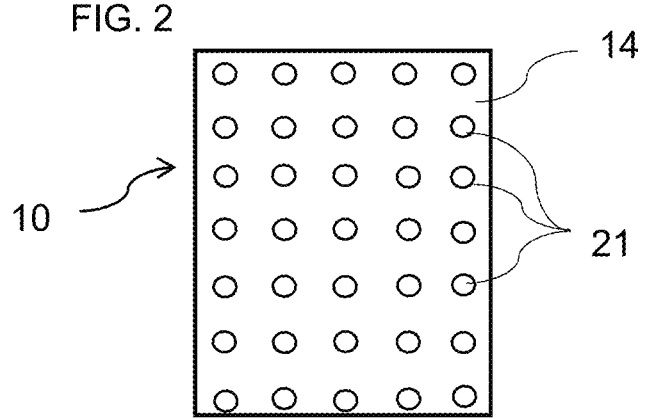
FIG. 2 shows a top (axial) view of the gypsum board of FIG. 1, in which the arrangement of the plurality of perforations in the back cover sheet can be better seen.

FIG. 2 shows a top (axial) view of the wallboard panel 10, in which an illustrative configuration of perforations 21 may be seen within backer paper cover sheet 14. As depicted, the perforations 21 are patterned in a regular array of columns and rows. It is to be appreciated that other patterned arrangements of perforations 21 also reside within the scope of the invention, and the depicted number, spacing and coverage density of the perforations 21 should not be considered limiting.

Systems

Figure 3:
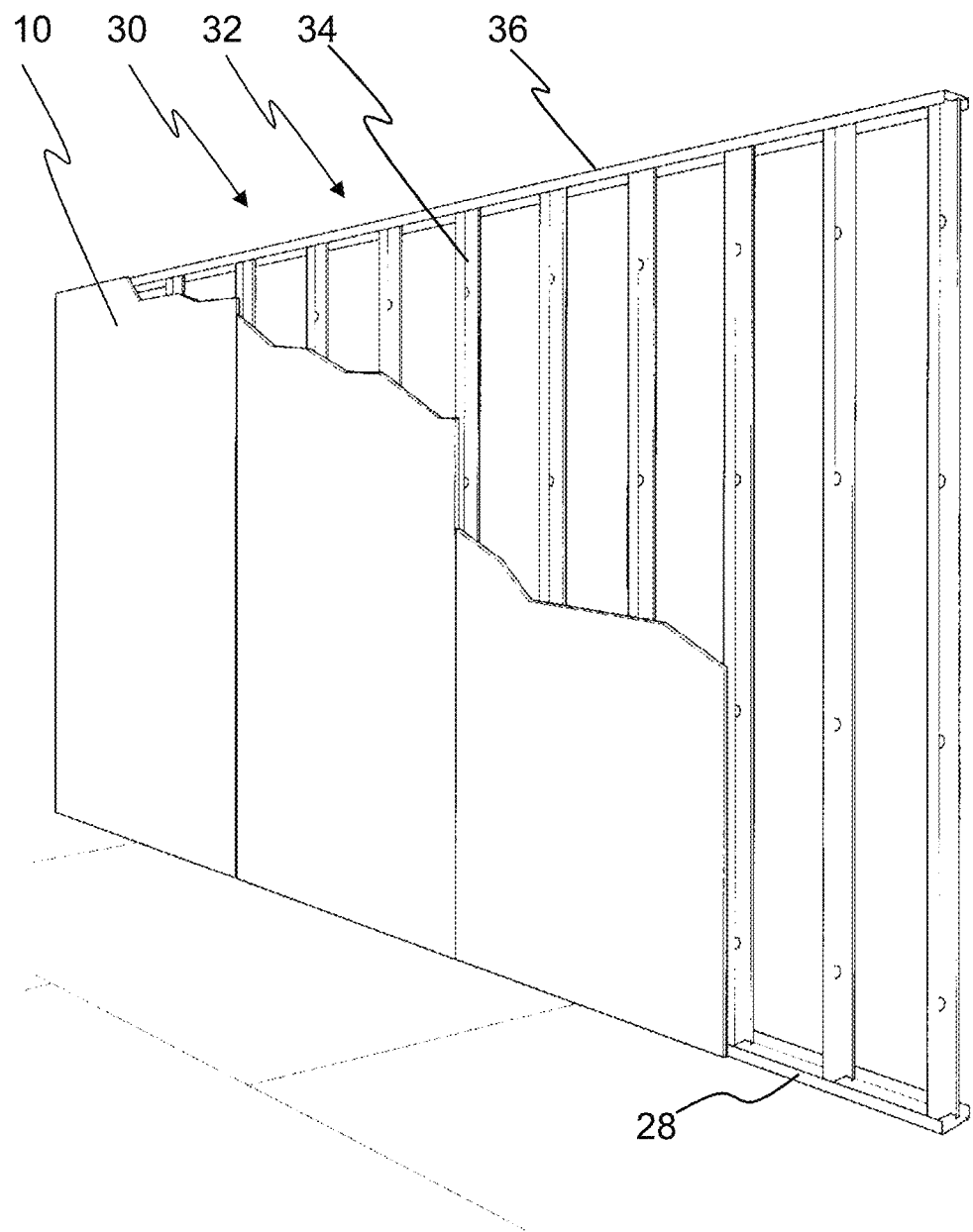
FIG. 3 shows a perspective view of a gypsum board of the present invention attached to one side of a metal stud wall suitable in the wall system of the present invention.

FIG. 3 is a perspective view of a typical building wall system 30 that may be employed in a wall system of the present invention. FIG. 2 shows metal stud wall "skeleton" 32 which includes a plurality of metal studs 34, an upper track 36, a lower track 38. Gypsum boards 10 (FIG. 1) may be secured in any known manner to one or both sides of the metal studs 34 to close the wall and form the interior surface or surfaces of the wall or a ceiling. A typical metal stud wall "skeleton" may be fabricated according to U.S. Pat. No. 6,694,695 to Collins et al., incorporated herein by reference, which is suitable for combination with an exterior sheathing panel to achieve a wall system of the present invention. This metal frame system is merely provided as illustrative as wood or other metal frames may also be employed.

The following examples further illustrate the invention but, of course, should not be construed as in any way limiting its scope.

EXAMPLES

Gypsum core (slurry) formulations with a high chloride concentration in the form of NaCl or $MgCl_2$ were prepared as specified in Table 1. Samples indicated as containing $MgCl_2$ or NaCl plus starch refer to testing of those samples with a starch layer upon the back paper cover sheet (see Table 2 below). Thus, the board cores defined by Samples #1 and #2 are compositionally identical to one another, as are Samples #3 and #4. All of the gypsum core formulations contained a small amount of cooked corn starch.

TABLE 1

Gypsum core formulations

| CORE | 1200 ppm $Cl^-$ from $MgCl_2$ | 1200 ppm $Cl^-$ from $MgCl_2$ + starch | 2100 ppm $Cl^-$ from NaCl | 2100 ppm $Cl^-$ from NaCl + starch | 2000 ppm $Cl^-$ from NaCl | 30 ppm Cl from NaCl |
|---|---|---|---|---|---|---|
| Sample ID | #1 | #2 | #3 | #4 | #5 (no starch + perforation); #6 (with starch + perforation) | #7 (no starch); #8 (with starch) |
| Thickness | ½" | ½" | ½" | ½" | ½" | ½" |
| Stucco (g) (calcium sulfate hemihydrate) | 900 | 900 | 900 | 900 | 900 | 900 |
| HRA (g)[1] | 3.6 | 3.6 | 3.6 | 3.6 | 3.6 | 3.6 |
| cooked (also known as pre-gelled) corn starch (g) | 2.7 | 2.7 | 2.7 | 2.7 | 2.7 | 2.7 |
| Fiberglass (g) | 2.5 | 2.5 | 2.5 | 2.5 | 2.5 | 2.5 |
| NaCl (g) | — | — | 3.46 | 3.46 | 3.30 | 0.049 |
| $MgCl_2$ (g) | 1.45 | 1.45 | — | — | — | — |
| 10% Sodium Trimetaphosphate Solution (g)[2] | 5.4 | 5.4 | 5.4 | 5.4 | 5.4 | 5.4 |
| 1% Retarder (g)[2] | 25 | 25 | 25 | 25 | 25 | 25 |
| Gauge water (g) | 861 | 861 | 861 | 861 | 861 | 861 |

[1] HRA = heat resistant accelerator
[2] grams of solution, % is wt. %

12 inch×12 inch×½ inch envelopes were made by using Manila paper (46 pounds/MSF) as a front paper cover sheet and Newsline paper (40 pounds/MSF) as a back cover sheet. Prior to pouring the slurry formulations (Table 1) into the envelope, diluted starch solutions (Table 2) were brushed onto the core (inner) side of the back paper cover sheet used for Samples #2 and #4.

TABLE 2 diluted starch concentration and usage

| | Sample ID | | | | | | | |
|---|---|---|---|---|---|---|---|---|
| | #1 | #2 | #3 | #4 | #5 | #6 | #7 | #8 |
| Back paper treatment solution | No starch | 4% uncooked starch + 4% cooked (also known as pre-gelled) corn starch | No starch | 8% uncooked starch | No starch | 5% uncooked starch on perforated back paper | No starch | 5% uncooked starch |
| Change in paper weight (g) | 0 | 10 | 0 | 10 | 0 | 10 | 0 | 10 |

TABLE 2-continued diluted starch concentration and usage

| | Sample ID | | | | | | | |
|---|---|---|---|---|---|---|---|---|
| | #1 | #2 | #3 | #4 | #5 | #6 | #7 | #8 |
| Dry starch weight (lbs/MSF) | 0 | 0.9 lbs uncooked starch + 0.9 lbs cooked (also known as pre-gelled) corn starch | 0 | 1.8 lbs uncooked starch | 0 | 1.1 lbs uncooked starch | 0 | 1.1 lbs uncooked starch |

The slurry formulations (Table 1) were prepared by soaking dry powders in solution for 10 seconds and mixing for 10 seconds in a Hobart mixer, followed by injecting the resulting foam for 4.5 seconds and mixing another 2 seconds. The slurry thus obtained was poured into each of the envelopes. After the slurry had set and hardened, the envelope was sealed using a paper tape. The sealed board was dried at 450° F. for 20 minutes and then moved to a 350° F. oven. After drying at 350° F. for 15 minutes, the board was further dried at 110° F. overnight.

The effects of the starch treatment were evaluated by an "X" cut method to test the paper-to-core bond. Several "X"-shaped cuts were made on the back paper of the finished wallboard samples. The size of the "X"-shaped cut was about 2 inches×2 inches. The paper was peeled from the center of the cut. The samples were evaluated qualitatively in comparison to one another by evaluating the amount of paper remaining on the gypsum core of the wallboard following peeling. If there is good adhesion to the gypsum core, a thin layer of paper remains on the core. In contrast, if there is poor adhesion to the core, the paper peels off from the core and leaves more of the core exposed.

Figure 4:
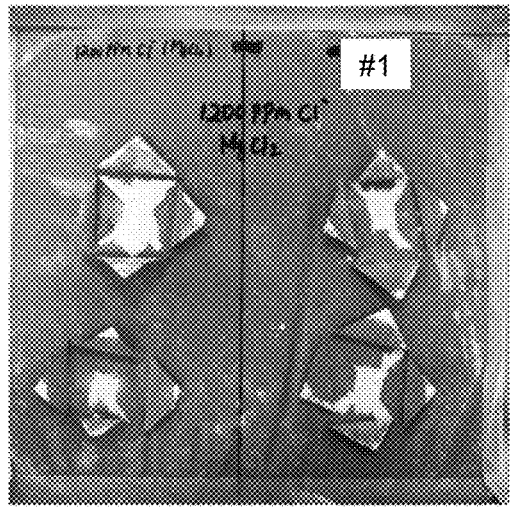
FIG. 4 shows photographs showing the effect of diluted starch solution on 12 inch×12 inch×½ inch gypsum board containing 1200 ppm $Cl^-$ from $MgCl_2$ per million parts calcium sulfate hemihydrate.
Figure 4:
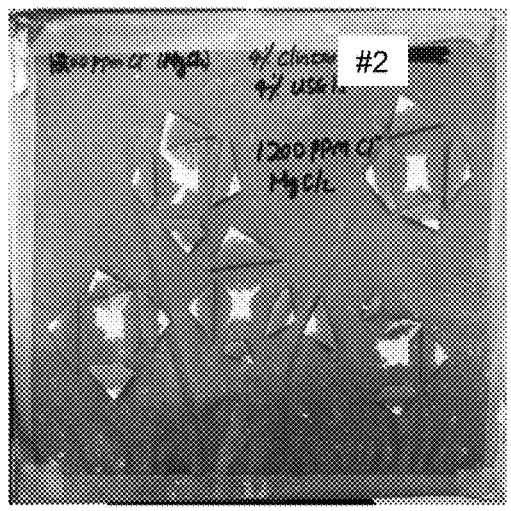

FIG. 4 shows photographs showing the effect of diluted starch solution on 12 inch×12 inch×½ inch board containing 1200 ppm Cl⁻ from $MgCl_2$ per million parts calcium sulfate hemihydrate. Control sample board #1 did not have a starch layer between its paper cover sheet and its gypsum core. Experimental sample board #2 had a starch layer between its paper cover sheet and its gypsum core.

Figure 5:
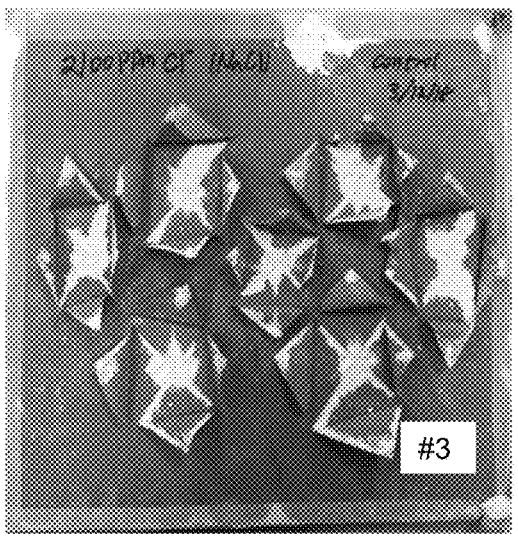
FIG. 5 shows photographs showing the effect of diluted starch solution on 12 inch×12 inch×½ inch gypsum board containing 2100 ppm $Cl^-$ from $MgCl_2$ per million parts calcium sulfate hemihydrate.
Figure 5:

FIG. 5 shows photographs showing the effect of diluted starch solution on 12 inch×12 inch×½ inch board containing 2100 ppm Cl⁻ from $MgCl_2$ per million parts calcium sulfate hemihydrate. Control sample board #3 did not have a starch layer between its paper cover sheet and its gypsum core. Experimental sample board #4 had a starch layer between its paper cover sheet and its gypsum core.

Comparing FIG. 4 sample boards #1 and #2 against one another, experimental sample board #2 with a starch layer had a smaller area of exposed gypsum at each "X" cut than did control sample board #1 lacking the starch layer. This indicates the starch layer significantly improved adhesion of the paper cover sheet to the gypsum core layer made from an aqueous gypsum slurry containing 1200 ppm Cl⁻ anion.

Similarly, comparing FIG. 5 samples #3 and #4 against one another, experimental sample board #4 with a starch layer had a smaller area of exposed gypsum at each "X" cut than did control sample board #2 lacking the starch layer. This indicates the starch layer significantly improved adhesion of the paper cover sheet to the gypsum core layer made from an aqueous gypsum slurry containing 2100 ppm Cl⁻ anion.

Figure 6:
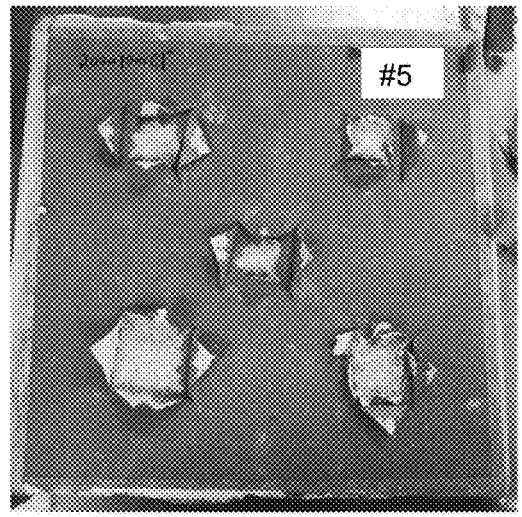
FIG. 6 shows photographs showing the effect of diluted starch solution and perforation on 12 inch×12 inch×½ inch gypsum board containing 2000 ppm from NaCl per million parts calcium sulfate hemihydrate.
Figure 6:
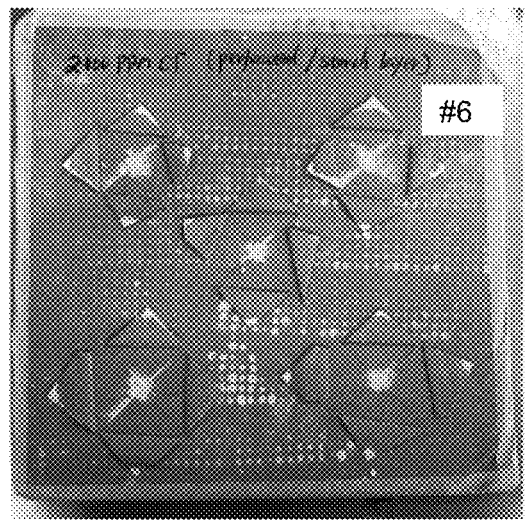

FIG. 6 shows photographs showing the effect of diluted starch solution of the same uncooked starch as used in the above examples and, in addition, perforations on 12 inch×12 inch×½ inch gypsum board having a gypsum core made from stucco containing 2000 ppm Cl⁻ from NaCl per million parts calcium sulfate hemihydrate. FIG. 6 compared a control sample board #5 with experimental sample board #6 of the present invention. The control board #5 had a back paper cover sheet having no perforations and no starch layer between the back paper cover sheet and gypsum core. The experimental sample board #6 of the present invention had a perforated paper cover sheet and a starch layer between the back paper cover sheet and gypsum core. For this perforated paper sheet, the distance between adjacent perforations was ¼ inch. The diameter of the perforations was about 0.01 to 0.02 inch.

On comparing sample boards #5 and #6 of FIG. 6 when the Chloride anion is 2000 ppm, experimental sample board #6 with a starch layer and perforation treatment had a smaller area of exposed gypsum. Thus, the experimental sample board #6 had better adhesion than the control sample board #5.

Also, comparing the experimental sample board #6 of FIG. 6 to the experimental sample board #2 of FIG. 5 with the same starch layer but no perforations showed the perforations further improved adhesion.

Figure 7:
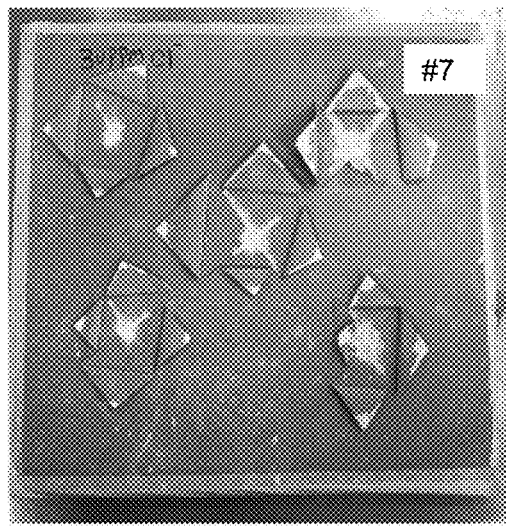
FIG. 7 shows photographs showing the effect of diluted starch solution on 12 inch×12 inch×½ inch gypsum board containing 30 ppm $Cl^-$ from NaCl per million parts calcium sulfate hemihydrate.
Figure 7:
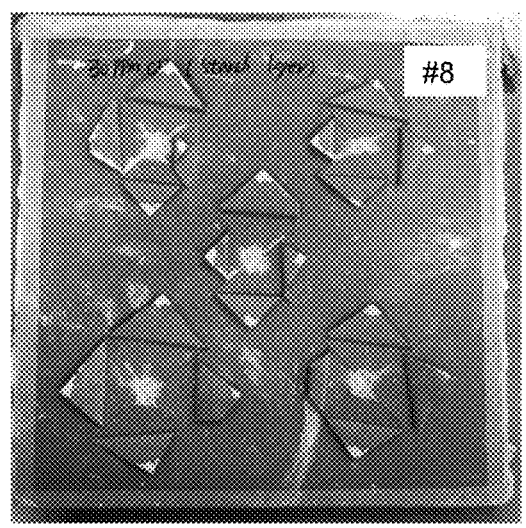

FIG. 7 shows photographs showing the effect of using diluted starch solution on 12 inch×12 inch×½ inch gypsum board having a gypsum core made from stucco containing 30 ppm Cl⁻ from NaCl per million parts calcium sulfate hemihydrate. This stucco represents conventional low chloride salt stucco. The diluted starch solution was the same as in the sample boards of FIG. 6. FIG. 7 shows a control sample board #7 with a back paper cover sheet having no starch layer between the back paper cover sheet and gypsum core. FIG. 7 also shows an experimental sample board #8 having a starch layer between the back paper cover sheet and gypsum core.

On comparing control sample board #7 and experimental sample board #8 when the chloride anion is 30 ppm, the exposed area of control board #7 is similar to that of experimental board #8. This indicates the starch layer did not significantly improve the paper-to-core bond for these samples where low levels of chloride salts were present.

The preceding are merely examples of the invention. It will be understood by one of ordinary skill in the art that each of these examples may be used in various combinations with the other aspects of the invention provided herein.

Clauses of the Invention

Various aspects of the present invention are described by the following clauses:

1. A gypsum board comprising:
a board core layer comprising set gypsum,
a front paper cover sheet having an outer surface and an inner surface, the inner surface contacting a first face of the board core; and
a back paper cover sheet having an outer surface and an inner surface, the inner surface contacting a second face of the board core;
wherein the inner surface of at least one of the front paper cover sheet and the back paper cover sheet is coated with a starch layer;
wherein the core layer is between the first cover sheet and the second cover sheet,
wherein the core layer resulted from setting, between the front paper cover sheet and the back cover sheet, an aqueous slurry comprising a mixture of water and stucco, wherein the stucco comprises calcium sulfate hemihydrate, wherein the aqueous slurry comprises:
at least 60 weight percent said calcium sulfate hemihydrate on a dry basis,
about 500 ppm to about 3000 ppm chloride anion per 1,000,000 parts by weight said calcium sulfate hemihydrate, and
said water at a weight ratio of water to the calcium sulfate hemihydrate of 0.2:1 to 1.2:1.

Clause 2. The gypsum board of clause 1, wherein the starch layer is a continuous starch layer on the entire inner surface of at least one of the front paper cover sheet and the back cover sheet.

Clause 3. The gypsum board of clause 1 or 2, wherein the starch layer comprises uncooked starch.

Clause 4. The gypsum board of any one of clauses 1-3, wherein the starch layer comprises a mixture of uncooked starch and cooked starch.

Clause 5. The gypsum board of any preceding clause, wherein the aqueous slurry comprises about 1000 ppm to about 3000 ppm chloride anion per 1,000,000 parts by weight said calcium sulfate hemihydrate.

Clause 6. The gypsum board of any preceding claim, wherein the starch layer is coated on the inner surface of the back cover sheet.

Clause 7. The gypsum board of any preceding clause, wherein the starch layer is coated on the inner surface of the front paper cover sheet and the inner surface of the back cover sheet.

Clause 8. The gypsum board of any preceding clause, wherein the front paper cover sheet is a front paper cover sheet and the back paper cover sheet is a back paper cover sheet.

Clause 9. The gypsum board of any preceding clause, wherein the board core comprises a low-density region and at least one high-density region, the at least one high-density region being interposed as a layer between the low-density region and the front paper cover sheet or the back cover sheet.

Clause 10. The gypsum board of clause 9, wherein the low-density region is sandwiched between a first high-density region disposed as a first layer contacting the front paper cover sheet or a starch layer coated thereon and a second high-density region disposed as a second layer contacting the back paper cover sheet or a starch layer coated thereon.

Clause 11. The gypsum board of clause 9 or 10, wherein the low-density region is formed from a foamed gypsum slurry and comprises a plurality of voids therein.

Clause 12. The gypsum board of any preceding clause, wherein the starch layer is coated on the inner surface in an amount from about 0.5 lb/MSF to about 15 lbs/MSF, about 0.5 lb/MSF to about 5 lbs/MSF, more preferably about 1 lb/MSF to about 2 lbs/MSF.

Clause 13. The gypsum board of any preceding clause, wherein the set gypsum is formed from synthetic gypsum comprising the one or more chloride salts.

Clause 14. A method of making a gypsum board, comprising: preparing an aqueous slurry comprising a mixture of water and stucco, wherein the stucco comprises calcium sulfate hemihydrate, wherein the aqueous slurry comprises a mixture of:
at least 60 weight percent said calcium sulfate hemihydrate on a dry basis,
about 500 ppm to about 3000 ppm chloride anion per 1,000,000 parts by weight (pbw) said calcium sulfate hemihydrate, and
the water at a weight ratio of water to the calcium sulfate hemihydrate of 0.2:1 to 1.2:1; and
disposing the aqueous slurry between a front paper cover sheet and a back cover sheet, each cover sheet having an inner surface and an outer surface;
wherein the inner surface of at least one of the front paper cover sheet and the back paper cover sheet is coated with a starch layer, wherein the aqueous slurry contacts the starch layer;
setting the calcium sulfate hemihydrate to form a panel comprising a gypsum core comprising calcium sulfate dihydrate; and
drying the panel and cutting the panel into a gypsum board having one or more pre-determined dimensions.

Clause 15. The method of clause 14, further comprising:
applying the starch layer to the inner surface of at least one of the front paper cover sheet and the back paper cover sheet as a continuous starch layer covering the entire inner surface.

Clause 16. The method of clause 14, further comprising:
applying the starch layer to the inner surface of at least one of the front paper cover sheet and the back paper cover sheet as a continuous starch layer covering the entire inner surface, wherein the back paper cover sheet has perforations.

Clause 17. The method of any one of clauses 14-16, wherein at least a portion of the gypsum slurry is in a foamed state while being disposed between the front paper cover sheet and the back cover sheet.

Clause 18. The method of clause 17, wherein a first portion of the gypsum slurry is disposed in an unfoamed state as a first high-density region in layer form contacting the front paper cover sheet or a starch layer thereon and a second portion of the gypsum slurry is disposed in a foamed state as a low-density region contacting the first high-density region.

Clause 19. The method of clause 18, wherein the low-density region is sandwiched between the first high-density region and a second high-density region in layer form contacting the back paper cover sheet or a starch layer thereon.

Clause 20. The method of any one of clauses 14-19, wherein the starch layer is coated in an amount from about 0.5 lb/MSF to about 15 lbs/MSF, preferably about 0.5 lb/MSF to about 15 lbs/MSF, more preferably about 1 lb/MSF to about 2 lbs/MSF.

Clause 21. The method of any one of claims 14-19, wherein the calcium sulfate hemihydrate comprises synthetic gypsum comprising the one or more chloride salts.

Clause 22. A wall system comprising framing to which is attached at least one gypsum board of any of clauses 1-13, wherein the outer surface of the front paper cover sheet faces away from the framing.

Clause 23. The wall system of clause 22, wherein the gypsum board is on an interior wall or ceiling of a building.

Clause 24. The wall system of clause 22 or 23, wherein the framing is of wood.

Clause 25. The wall system of clause 22 or 23, wherein the framing is of metal.

Clause 26. The wall system of any one of clauses 22-25, wherein the at least one gypsum board is attached to the framing by any one or more of screws, nails, or glue.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. "Bonding relation" does not mean that two layers are in direct contact. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Unless otherwise indicated, all percentages, ratios, and average molecular weights are on a weight basis.

What is claimed is the following:

1. A gypsum board comprising: a board core layer comprising set gypsum, a front first paper cover sheet having an outer surface and an inner surface, the inner surface contacting a first face of the board core; and a back second paper cover sheet having an outer surface and an inner surface, the inner surface contacting a second face of the board core; wherein the inner surface of at least one of the front first paper cover sheet and the back second paper cover sheet is coated with a starch layer, wherein the starch layer results from coating at least one of the front first paper cover sheet and the back second paper cover sheet with a starch-containing composition that is substantially free of each of gypsum, inorganic filler, organic filler, and polymer; wherein the starch layer is a continuous starch layer on the entire inner surface of at least one of the front first paper cover sheet and the back second paper cover sheet; wherein the board core layer further comprises additional starch, wherein the core layer is between the front first paper cover sheet and the back second paper cover sheet, wherein the core layer resulted from setting, between the front first paper cover sheet and the back second paper cover sheet, an aqueous slurry comprising a mixture of water and stucco, wherein the stucco comprises calcium sulfate hemihydrate, wherein the aqueous slurry comprises: starch to provide the additional starch of the core layer, at least 60 weight percent said calcium sulfate hemihydrate on a dry basis, about 500 parts by weight to about 3000 parts by weight chloride anion per 1,000,000 parts by weight said calcium sulfate hemihydrate, and said water at a weight ratio of water to the calcium sulfate hemihydrate of 0.2:1 to 1.2:1.

2. The gypsum board of claim 1, wherein the back second paper cover sheet has perforations.

3. The gypsum board of claim 1, wherein the starch layer comprises uncooked starch.

4. The gypsum board of claim 1, wherein the starch layer comprises a mixture of uncooked starch and cooked starch.

5. The gypsum board of claim 1, wherein the aqueous slurry comprises about 1000 parts by weight to about 3000 parts by weight chloride anion per 1,000,000 parts by weight said calcium sulfate hemihydrate.

6. The gypsum board of claim 1, wherein the starch layer is coated on the inner surface of the back second paper cover sheet.

7. The gypsum board of claim 1, wherein the starch layer is coated on the inner surface of the front first paper cover sheet and the inner surface of the back second paper cover sheet, wherein starch in the starch layer is non-migratory starch having molecular weight of at least 15,000 Daltons.

8. The gypsum board of claim 7, wherein the board core comprises a low-density layer region comprising the set gypsum and a high-density layer region comprising the set gypsum, wherein the low-density layer region is formed from a foamed gypsum slurry and comprises a plurality of voids therein, the high-density layer region being interposed as a layer between the low-density layer region and the starch layer which is coated on the inner surface of the front first paper cover sheet.

9. The gypsum board of claim 1, wherein the board core comprises a low-density region comprising the set gypsum and at least one high-density region comprising the set gypsum, the at least one high-density region being interposed as a layer between the low-density region and the front first paper cover sheet or the back second paper cover sheet.

10. The gypsum board of claim 9, wherein the low-density region comprising the set gypsum is sandwiched between a first high-density region comprising the set gypsum disposed as a first layer contacting the front first paper cover sheet or a starch layer coated thereon and a second high-density region comprising the set gypsum disposed as a second layer contacting the back second paper cover sheet or a starch layer coated thereon.

11. The gypsum board of claim 9, wherein the low-density region is formed from a foamed gypsum slurry and comprises a plurality of voids therein.

12. The gypsum board of claim 1, wherein the starch layer is coated on the inner surface in an amount from about 0.5 lb/MSF to about 15 lbs/MSF.

13. The gypsum board of claim 1, wherein the set gypsum is formed from synthetic gypsum comprising the one or more chloride salts.

14. A method of making a gypsum board of claim 1, said method comprising: preparing an aqueous slurry comprising a mixture of water and stucco, wherein the stucco comprises calcium sulfate hemihydrate, wherein the aqueous slurry comprises a mixture of: starch to provide additional starch of the core layer, at least 60 weight percent said calcium sulfate hemihydrate on a dry basis, about 500 ppm to about 3000 ppm chloride anion per 1,000,000 parts by weight (pbw) said calcium sulfate hemihydrate, and the water at a weight ratio of water to the calcium sulfate hemihydrate of 0.2:1 to 1.2:1; and disposing the aqueous slurry between a front first paper cover sheet and a back second paper cover sheet, each cover sheet having an inner surface and an outer surface; wherein the inner surface of at least one of the front paper cover sheet and the back second paper cover sheet is coated with a starch layer, wherein the aqueous slurry contacts the starch layer; wherein the starch layer is a continuous starch layer on the entire inner surface of at least one of the front first paper cover sheet and the back second paper cover sheet; wherein the board core layer further comprises the additional starch, setting the calcium sulfate hemihydrate to form a panel comprising a gypsum core comprising calcium sulfate dihydrate; and drying the panel and cutting the panel into a gypsum board having one or more pre-determined dimensions.

15. The method of claim 14, wherein the back second paper cover sheet has perforations.

16. The method of claim 14, wherein at least a portion of the gypsum slurry is in a foamed state while being disposed between the front first paper cover sheet and the back second paper cover sheet.

17. The method of claim 16, wherein a first portion of the gypsum slurry is disposed in an unfoamed state as a first high-density region in layer form contacting the front paper cover sheet or a starch layer thereon and a second portion of the gypsum slurry is disposed in a foamed state as a low-density region contacting the first high-density region.

18. The method of claim 14, wherein the calcium sulfate hemihydrate comprises synthetic gypsum comprising the one or more chloride salts.

19. A wall system comprising framing and a gypsum board of claim 1 attached to the framing, wherein the outer surface of the front first paper cover sheet faces away from the framing.

* * * * *